(12) United States Patent
Mukherjee et al.

(10) Patent No.: US 11,106,330 B2
(45) Date of Patent: Aug. 31, 2021

(54) SELF-SERVE CONTENT CLASSIFICATION PLATFORM

(71) Applicant: Microsoft Technology Licensing, LLC, Redmond, WA (US)

(72) Inventors: Prithwish Mukherjee, West Bengal (IN); Shaik Zakir Hussain, Andhra Pradesh (IN); Aman Gupta, Delhi (IN); Shashi Kumar, Bihar (IN); Sachin Kakkar, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 16/369,554

(22) Filed: Mar. 29, 2019

(65) Prior Publication Data

US 2020/0310599 A1    Oct. 1, 2020

(51) Int. Cl.
| | |
|---|---|
| *G06F 3/0482* | (2013.01) |
| *G06F 3/0484* | (2013.01) |
| *G06F 16/28* | (2019.01) |
| *G06F 9/451* | (2018.01) |

(52) U.S. Cl.
CPC .......... *G06F 3/0482* (2013.01); *G06F 3/0484* (2013.01); *G06F 9/451* (2018.02); *G06F 16/287* (2019.01)

(58) Field of Classification Search
CPC ...... G06F 3/0482; G06F 3/0484; G06F 9/451; G06F 16/287
See application file for complete search history.

(56) References Cited

U.S. PATENT DOCUMENTS

| | | | | |
|---|---|---|---|---|
| 9,201,927 B1* | 12/2015 | Zhang | ................... | G06F 40/30 |
| 9,251,295 B2* | 2/2016 | Adams | ................. | G06F 16/904 |
| 10,817,619 B1* | 10/2020 | Kolli | ..................... | H04L 63/205 |
| 2011/0161419 A1* | 6/2011 | Chunilal | ................ | H04L 51/14 |
| | | | | 709/204 |
| 2013/0254231 A1* | 9/2013 | Decker | ................ | G06F 16/951 |
| | | | | 707/770 |
| 2016/0055221 A1* | 2/2016 | Paquette | ............... | G06F 16/287 |
| | | | | 707/722 |
| 2016/0364215 A1* | 12/2016 | Brachetti | ............. | G06F 3/0482 |

(Continued)

*Primary Examiner* — Huawen A Peng
(74) *Attorney, Agent, or Firm* — Hickman Becker Bingham Ledesma LLP

(57) ABSTRACT

Techniques for implementing a self-serve content classification platform are provided. In one technique, through a user interface (UI) of the content classification platform, a user selects an option corresponding to a particular processor type. A processor configuration is also received through the same or different UI. Based on the user selection and the processor configuration, processor data that associates the particular processor type and the processor configuration is stored in association with a client context. A content classification request is received from a client associated with the client context. In response to receiving the content classification request, content that is referenced by the content classification request is identified, the processor data is accessed based on the content classification request, a processor that is defined based on the processor data is caused to be executed based on the content, and a result is generated based on output from the processor.

20 Claims, 24 Drawing Sheets

(56) References Cited

U.S. PATENT DOCUMENTS

| | | | |
|---|---|---|---|
| 2017/0235848 A1* | 8/2017 | Van Dusen | G06F 16/904 |
| | | | 705/12 |
| 2018/0276462 A1* | 9/2018 | Davis | G06K 9/00449 |
| 2018/0330011 A1* | 11/2018 | DeLuca | G06F 16/9032 |
| 2019/0065615 A1* | 2/2019 | Room | G06F 16/90348 |
| 2021/0049205 A1* | 2/2021 | Frank | G06Q 30/00 |

* cited by examiner

SELF-SERVE CONTENT CLASSIFICATION PLATFORM

TECHNICAL FIELD

The present disclosure relates to electronic content classification systems and, more particularly, to a self-serve classification system that supports multiple types of clients.

BACKGROUND

Many online services allow users to upload and share electronic content (e.g., text, images, video) with other users of the online services. Such online services might utilize a classification system to determine whether such user-uploaded content is inappropriate, spam, low quality, etc. Content filtering is a widely followed process for keeping any website or online service free of spam or unwanted data. This is particularly important for online networking services to provide a consistent quality of information to members of the community or to validate that the information pertains to the terms of service promised by the online networking service to its members.

Relatively sophisticated enterprises that host online services may develop many server-side applications that rely on the classification system. However, the multitude of server-side applications (or "clients" of the classification system) and the ad hoc nature of integrating clients with services offered by the classification system has yielded a state of affair where integrating a single new client into the classification system requires weeks and hundreds of hours. The reasons that client integration (and maintenance) is so labor intensive is because legacy classification systems suffer from significant drawbacks.

For example, legacy classification systems do not provide a unified dashboard. Instead, different aspects of the classification system (e.g., activation of processors, performance/system level metrics, enabling sampling for precision/recall measurement of classifiers, integration guidelines/checklist) are scattered in different storage locations and code. This causes hindrance in maintenance and operation of the classification system.

Another drawback is that there is no uniformity across different classification subsystems. As a result, much effort and time is needed to add any new classification service.

Another drawback is that integration of new clients requires significant boilerplate code changes, which becomes a bottleneck in launching new content types. For example, creation of a new content type requires commits in multiple codebases and subsequent sequential deployments. Also, extraction of features (e.g., user generated text, media or certain metadata) from an incoming classification request currently requires making boilerplate changes, which in turn requires multiple version upgrades and dependency on all client data templates. Additionally, adding configurations for processing the classification request requires mostly copying existing executable code with minor or no changes at all. However, this took significant effort and time to make changes in multiple classification services and deploying to production.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for unified content classification are provided. Since, content quality is so important for success of an online service (such as a social network service/online networking service), each and every product or feature launch needs integration with a content classification platform, which in many cases, includes activating well known and default actions to detect and filter any bad content. Traditionally, integration involves making boilerplate code changes. There was no way to easily view or edit the classification system as a whole. With the increase in the number of features and types of content being launched (e.g., video, hashtags, etc.), such a routine time-intensive procedure prevents client teams from adding member value quickly and also prevents simplified control of the classification system.

In one technique, a classification system stores configurations and enables users to add new configurations or update existing configurations on the fly. Example configurations include processor configurations, content extraction configurations, and applicability filter configurations. In a related technique, the classification system allows users to register a new client and select existing processors that will be applied to future requests from the new client.

Embodiments involve a self-service classification platform for dynamically maintaining the classification system as a dynamic directed acyclic graph (DAG) and providing ways to view and edit elements of the classification system via a self-serve frontend. Additionally, embodiments allow additions or edits to existing configurations to require only one-click changes without code changes or need for any deployments. Such computer-related improvements reduce client integration time from weeks to hours.

System Overview

Figure 1:
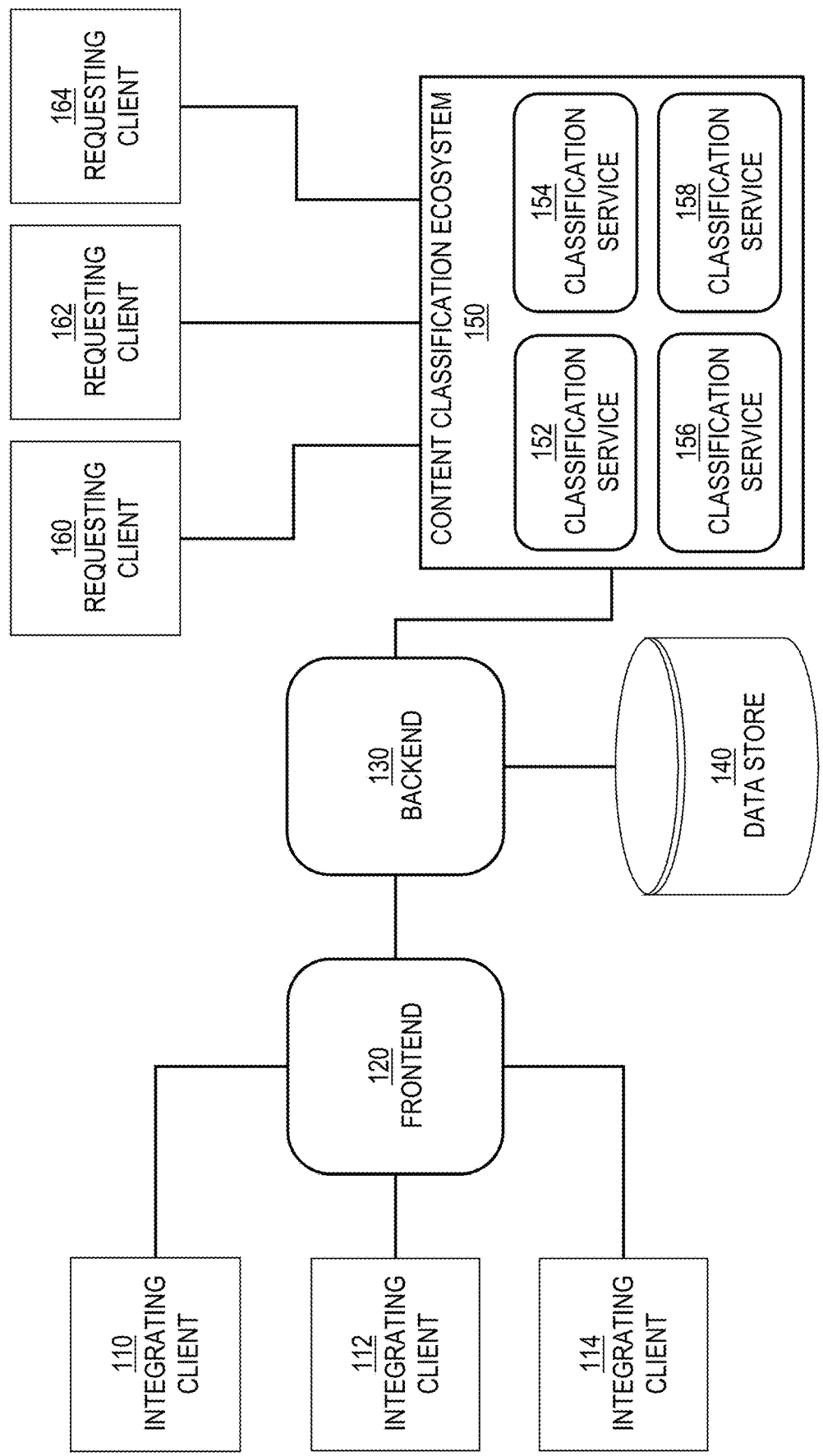
FIG. 1 is a block diagram of an example content classification system, in an embodiment.

FIG. 1 is a block diagram of an example content classification system 100, in an embodiment. Content classification system 100 includes integrating clients 110-114, a frontend 120, a backend 130, a data store 140, a content classification ecosystem 150, and requesting clients 160-164. Integrating clients 110-114 are clients that are used to integrate a new requesting client with content classification ecosystem 150 or update configurations that might affect how content classification ecosystem 150 responds to requests from requesting clients. Users of integrating clients 110-114 leverage a user interface provided by frontend 120 to specify and/or select configurations for processors, content extraction, and/or filters in order to integrate requesting clients 160-164, described in more detail herein. In response to requests from each of clients 110-114, frontend 120 sends corresponding requests to backend 130, which retrieves the appropriate data (e.g., current settings, configurations of processors used by other clients, etc.) from data store 140 and returns the requested data to frontend 120, which displays the requested data through the user interface.

Once integrated, requesting clients 160-164 transmit content classification requests (e.g., over an internal computer network, not depicted) to content classification ecosystem 150. An example of a requesting client is a content delivery system that receives content items (e.g., ads comprising text and an image) from content providers (e.g., advertisers) and, before transmitting the content items to targeted end-users, sends the content items to content classification ecosystem 150 to determine whether the content items meet certain standards, such as not including profanity, certain classes of content (e.g., dating), depictions of violence, and other inappropriate content.

Another example of a requesting client is a user-generated content component that is part of a social network service that receives user-generated (UG) content from members of the social network service and distributes the UG content based on connections in a social network. Prior to distributing the UG content, the UG content component sends the UG content to content classification ecosystem 150 to determine whether the UG content meets certain standards (which may be the same or different than the standards for distributing content items). Examples of UG content include text, images, video, graphics, or any combination thereof.

Content classification ecosystem 150 includes one or more classification services or subsystems, such as classification services 152-158. One classification service may be a rule-based service while another classification service may be a machine-learned-based service, while another classification service may be a third-party service that ecosystem 150 calls or incorporates.

Based on a content classification request, content classification ecosystem 150 aggregates responses from one or more classification services and returns a result to the requesting client. For example, clients of content classification ecosystem 150 are agnostic of the platform internals services. The clients call a single public API (e.g., "/classifyContent"). An aggregator service (content validator 152) forwards each client request to all the relevant services (e.g., BAM, CRC, URI) and aggregates the responses from these services and then responds back to the requesting client, either in an online or near-line fashion.

Information about clients, processors, and their respective configurations are stored in data store 140. Client information includes name and description information and one or more processor (e.g., tree) identifiers. For example, data store 140 includes a "clients" table (or other data object) that lists multiple clients, each listing including a client identifier, a client name, and a client description. Data store 140 may include another table that lists multiple processors and includes a client identifier that is a foreign key of the "clients" table. Each listing of processor information may also include a name and version of the processor, a processor identifier, one or more configuration identifiers (or the actual configurations), a processor tree identifier, and/or a classification service identifier that identifies a classification service with which the processor is associated. While processor information is stored in data store 140, actual executable code of processors or classifiers may reside in content classification ecosystem 150 or in an associated system. Also, a copy of the processor information may be stored in one or more caches of content classification ecosystem 150 in order to allow for fast processing of content classification requests.

Even after one or more processors begin processing content classification requests, a user (through one of clients 110-114) may initiate updates data stored in data store 140, such as removing a processor from a processor tree, adding a processor to a processor tree, creating new processors, and modifying configurations of existing processors. Such updates flow through to backend 130, which applies the updates to data store 140, which may trigger an update to the one or more caches of content classification ecosystem 150. Additionally or alternatively, each classification service pulls updates from data store 140 periodically and maintains the cache(s). Thus, data store 140 acts as a central registry of client contexts, processor configurations, classifier references, content extraction configurations, and applicability filters.

Unified User Interface

Figure 2:
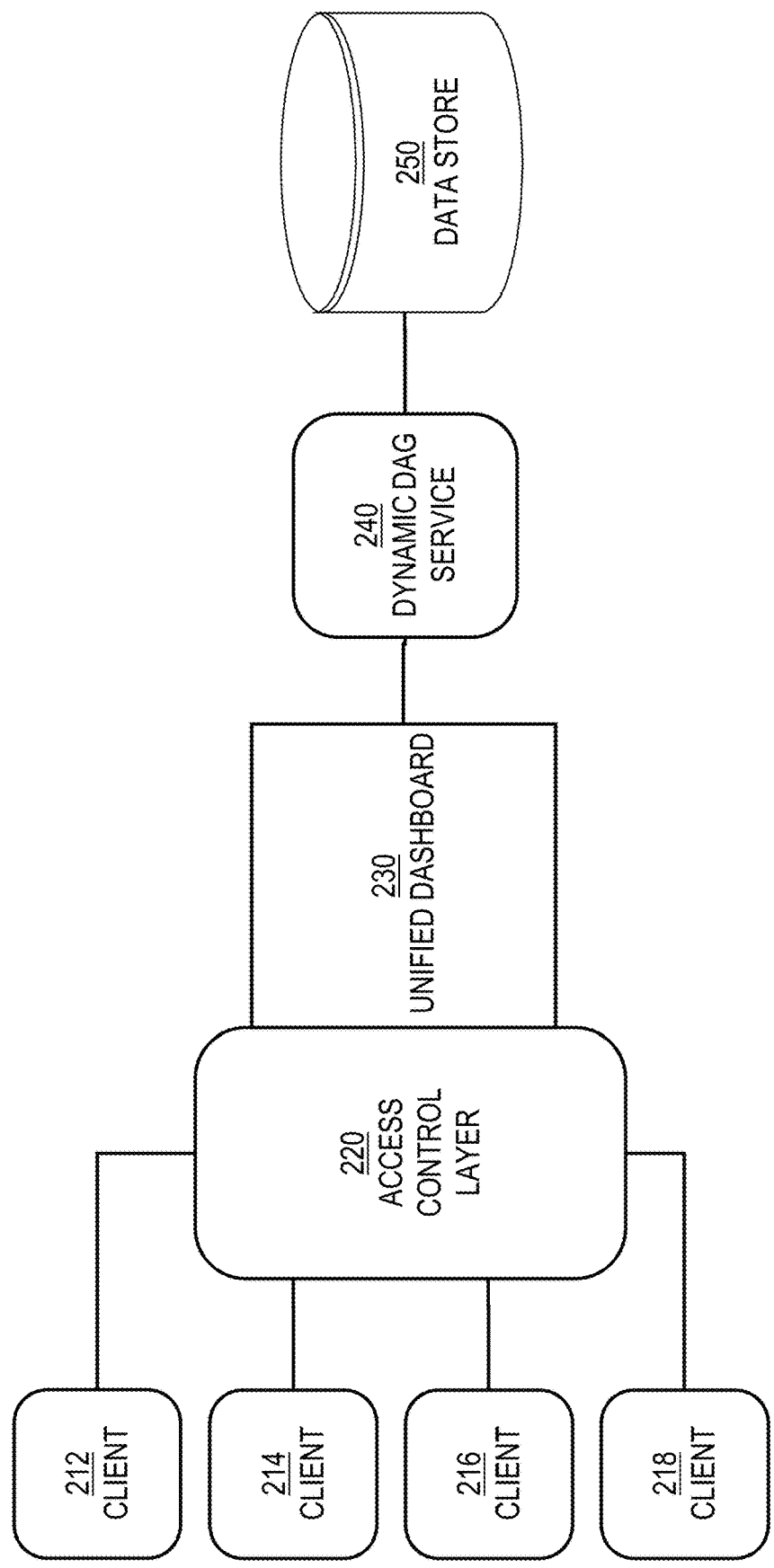
FIG. 2 is a block diagram that depicts an example unified system, in an embodiment.

FIG. 2 is a block diagram that depicts an example unified system 200, in an embodiment. Unified system 200 includes clients 212-218, an access control layer 220, a unified dashboard 230, a dynamic DAG service 240, and a data store 250. Access control layer 220 and unified dashboard 230 may be components of frontend 120. Also, data store 250 may correspond to data store 140. Access control layer 220 may be a pre-requisite for such a multi-tenant mutable system. Access control layer 220 maintains accountability through proper permissions which are used to restrict access. In a related embodiment, asymmetric permissions are supported by unified system 200. For example, some users will be allowed to disable non-compulsory classifications while not being allowed to disable compulsory classifications. Examples of compulsory classifications include checking for illegal content, checking for pornographic content, and checking for sales content. (In other scenarios, checking for sales content may be considered a non-compulsory classification.) Only certain users (e.g., an admin) of unified system 200 is allowed to remove or modify compulsory classifications or certain processors. The asymmetric permissions may be implemented by a set of rules that access control layer 220 implements.

Unified dashboard 230 provides a unified user interface as a one stop solution for client developers, analysts, data scientists, trust and safety reviewers, and product managers. Each of such users operates one of clients 212-218 to establish, request, or update (through the unified user interface) multiple types of information, such as feature extraction configurations, applicability filter configurations, integration documents and checklists, system lineage information, processor configurations, system level metrics, processor performance metrics, privacy configurations, and data sampling results and configurations. Through the unified user interface, a user (e.g. a client developer) can integrate a new client by specifying or selecting one or more of these configurations.

Examples of clients 212-218 include desktop computers, laptop computers, tablet computers, and smartphones. Clients 212-218 may transmit requests to unified dashboard 230 over a computer network, such as the Internet, a local area network (LAN), or a wide area network (WAN). Clients 212-218 may execute a web browser that processes a web application provided by unified dashboard 230. In this manner, the web application displays the unified user interface. Alternatively, clients 212-218 execute a native application that is configured to communicate with unified dashboard 230 in order to present the appropriate content on the unified user interface.

Regarding integration documents, data store 250 may include onboarding forms, checklists, and documents to enable users (e.g., client developers) to easily navigate through relevant documents needed for integration with content classification ecosystem 150.

Regarding metrics, system level metrics and lineage of system configurations are important for maintenance and auditing. The system may include a metrics module for snapshotting of data with relevant metrics to capture the state of the system at different times as well as auditing of the classification processes to generate performance metrics such precision/recall/memory used/latency, which are available on the dashboard.

Regarding privacy, unified dashboard 230 may enable one click selection of different privacy requirements to ensure user/member data stays secure.

Regarding data sampling, understanding processor behavior (including performance and system level metrics) on live traffic and generation of training data are important requirements for the purpose of data analysis. Unified dashboard 230 allows concerned users to enable sampling for processors and generate performance metrics via a generic sampling module. This performance metrics are viewable from the unified user interface.

Searching and Adding Clients

In order to integrate a new client, a legacy classification system needed to be updated manually (often in many different codebases corresponding to different classification services/subsystems) to support content classification requests transmitted from one or more instances of the new client. The classification system needs to know which client is sending content classification requests. Embodiments described herein allow for the seemly addition of new clients.

Figure 3A:
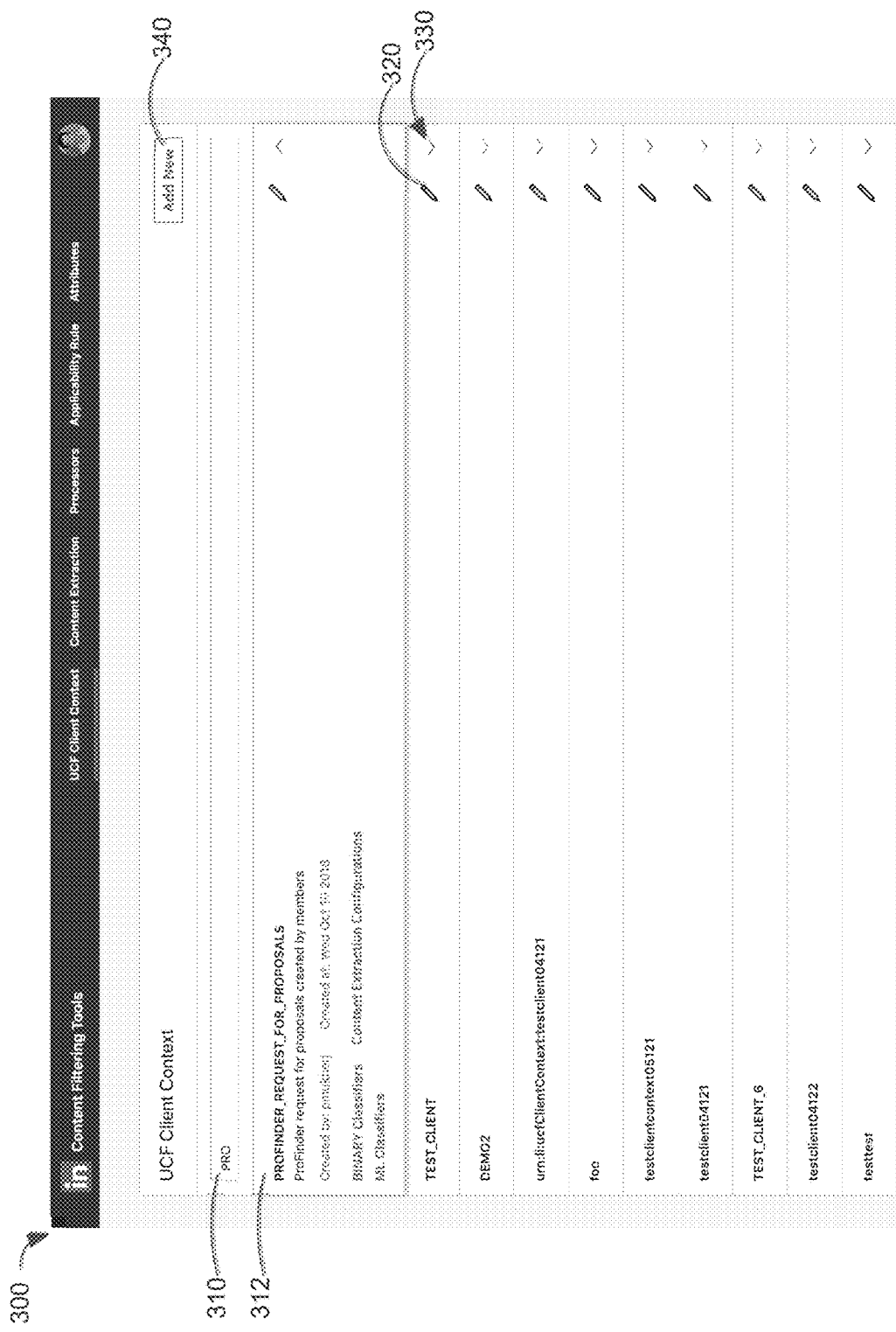
FIGS. 3A-3B are screenshots of example user interfaces for viewing and adding new clients to a content classification system, in an embodiment.

FIG. 3A is a screenshot of an example user interface 300 for viewing and adding new clients to a content classification system, in an embodiment. User interface 300 may be displayed to any user that has the proper permissions to view information about current clients, which information may be limited in order to ensure end-user privacy. User interface 300 lists multiple UCF client contexts (where UCF is an acronym for "unified content filtering"), each of which refers to a requesting client that has already been, or is being, integrated with the content classification ecosystem 150. In this example, ten different client contexts are listed.

User interface 300 includes a search field 310 that allows a user to insert one or more characters to search for a particular client context. In this example, the characters "PRO" are entered, resulting in client context 312 (entitled "PROFINDER_REQUEST_FOR_PROPOSALS") being displayed at the top of the listing. The listing for this client context includes a short description, a name of the creator of the client context, a date on which the client context was created, a listing of two classification services upon which the client context relies or leverages, and a link to content/feature exaction configurations that are used by content classification ecosystem 150 to identify and extract content from content classification requests from this client.

User interface 300 also includes, for each listed client context, an edit button 320 and an arrow button 330. Selection of edit button 320 allows the viewer to update the description of the corresponding client context. Selection of arrow button 330 causes additional information (other than just the name) of the corresponding client context to be displayed.

Figure 3B:
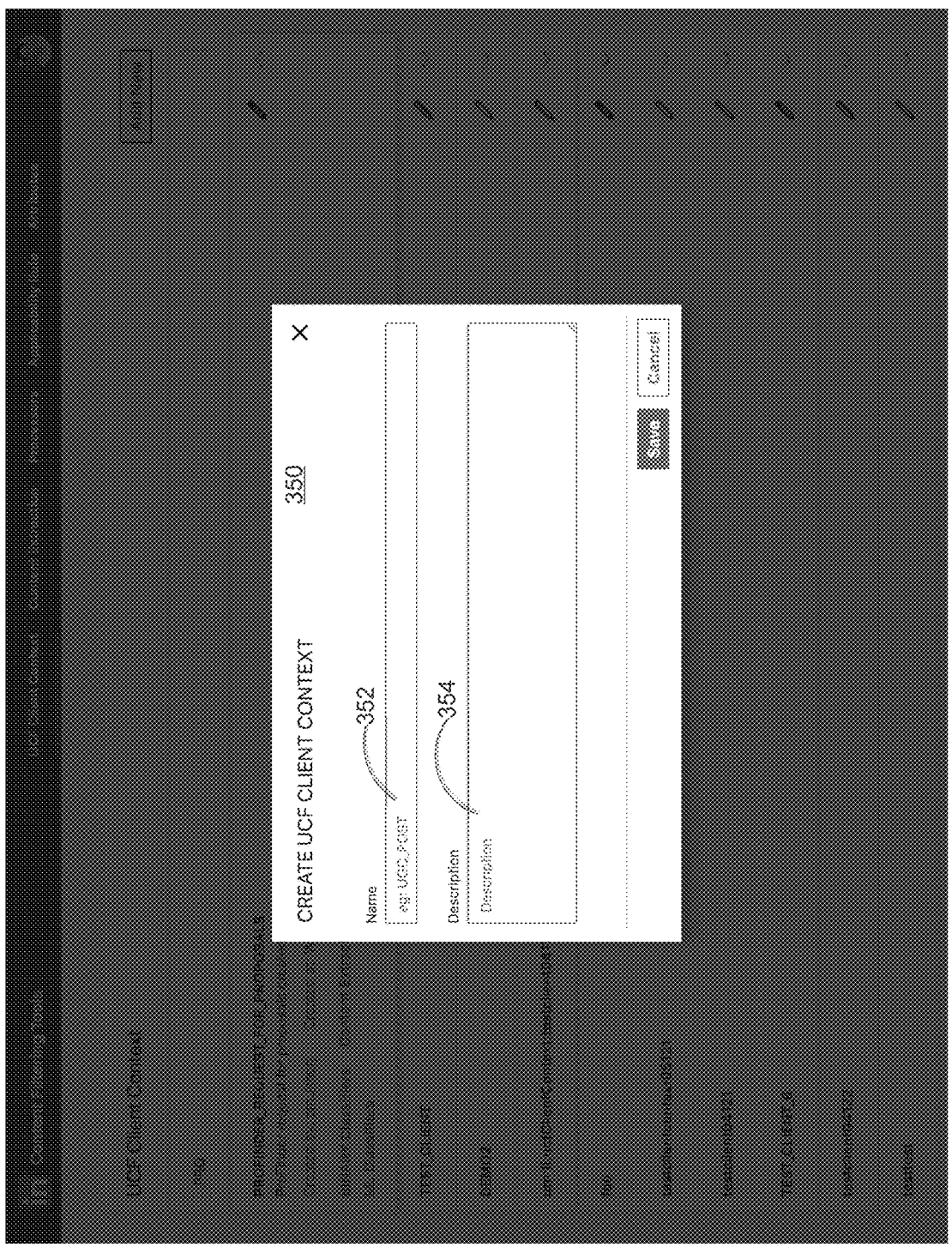

User interface 300 also includes an add button 340 that, when selected, causes user interface 350 to be displayed, which is depicted in FIG. 3B. User interface 350 includes a name field 352 and a description field 354 to allow the viewer to specify a name for the new client context and a description of the new client context. In response to user selection of the save button, the name and description of the new client context are sent to backend 130, which causes the name and description to be stored in data store 140. For example, backend 130 may generate (or retrieve) a new client context identifier and cause the name and description to be stored in association with the new client context identifier. Thereafter, any feature extraction configurations, processor configurations, and applicability filters created in the context of the new client content are stored in association with the new client content identifier.

Unification of Classification Services

In an embodiment, content classification system 100 implements a domain specific language (DSL) for invoking different classification services from an aggregator service. The aggregator service distributes a classification request (from a requesting client) to multiple internal services of content classification ecosystem 150 according to client identifier (indicated in the classification request) and a type of user-generated content present in the classification request. For example, if the media present in the subject content includes an image and video, then the aggregator service sends the classification request to classification services that host image/video-based classifiers. Similarly, if text is present in the user-generated content, then the aggregator service sends the classification request to a classification service hosting one or more text-based classifiers (e.g., regex based, near duplicate). From all these classification services, the aggregator service receives their respective responses, aggregates the responses, and sends back the aggregated response to the requesting client.

The aggregator service uses a generic DSL to invoke the different classification services, such as a fire-and-forget service, a nearline service, a rule-based service, a machine learning service, a near duplicate service, etc. Such a DSL reduces boilerplate integration time with an aggregator service from days to a few hours. Thus, new classification services may be integrated relatively easily.

Feature Extraction

In order to integrate a new client, a legacy classification system needs to be updated manually in many different codebases (corresponding to different classification services present in the system) to understand the classification requests from the new client. Feature extraction logic was written in a library, but then all the classification services need to "bump" the version of the library and redeploy the services. In other words, whenever changes with some new extraction logic are made to the library and the changes are committed, the library gets published with a newer version. Since all classification services are relying on an old version of the library, these services will not have the changes that have been applied to the library. Hence, there was a need to increase the version of the library in all the classification services, so that the classification services pick up the latest changes.

Also, the classification system needs to know which data in a classification request to extract. For example, the code of each classification service needs to know where to extract the content that the classification service is to classify. Embodiments described herein allow feature extraction to occur without updating the code of any classification service.

In an embodiment, content classification ecosystem 150 includes feature extraction functionality separate from any classifier or classification service. "Feature extraction" (or "content extraction") refers to the identification of applicable content (e.g., user-generated content) from within a content classification request transmitted by a requesting client. In order for a classification service to extract the appropriate data, frontend 120 presents a user interface to allow for the extraction of feature values required by a classifier in a way such that the classifier is not required to be aware of the data model of the incoming content classification request. In an embodiment, generic json based extraction is used to enable a dynamic feature extraction strategy.

In an embodiment, a feature extraction component (not depicted, but may execute in content classification ecosystem 150) extracts feature values (e.g., from a content classification request) required by a classifier. In order to identify the appropriate content to extract, the feature extraction component uses a feature extraction configuration associated with the corresponding requesting client. Different clients may be associated with different feature extraction configurations since different clients may implement a different data model.

Figure 4A:
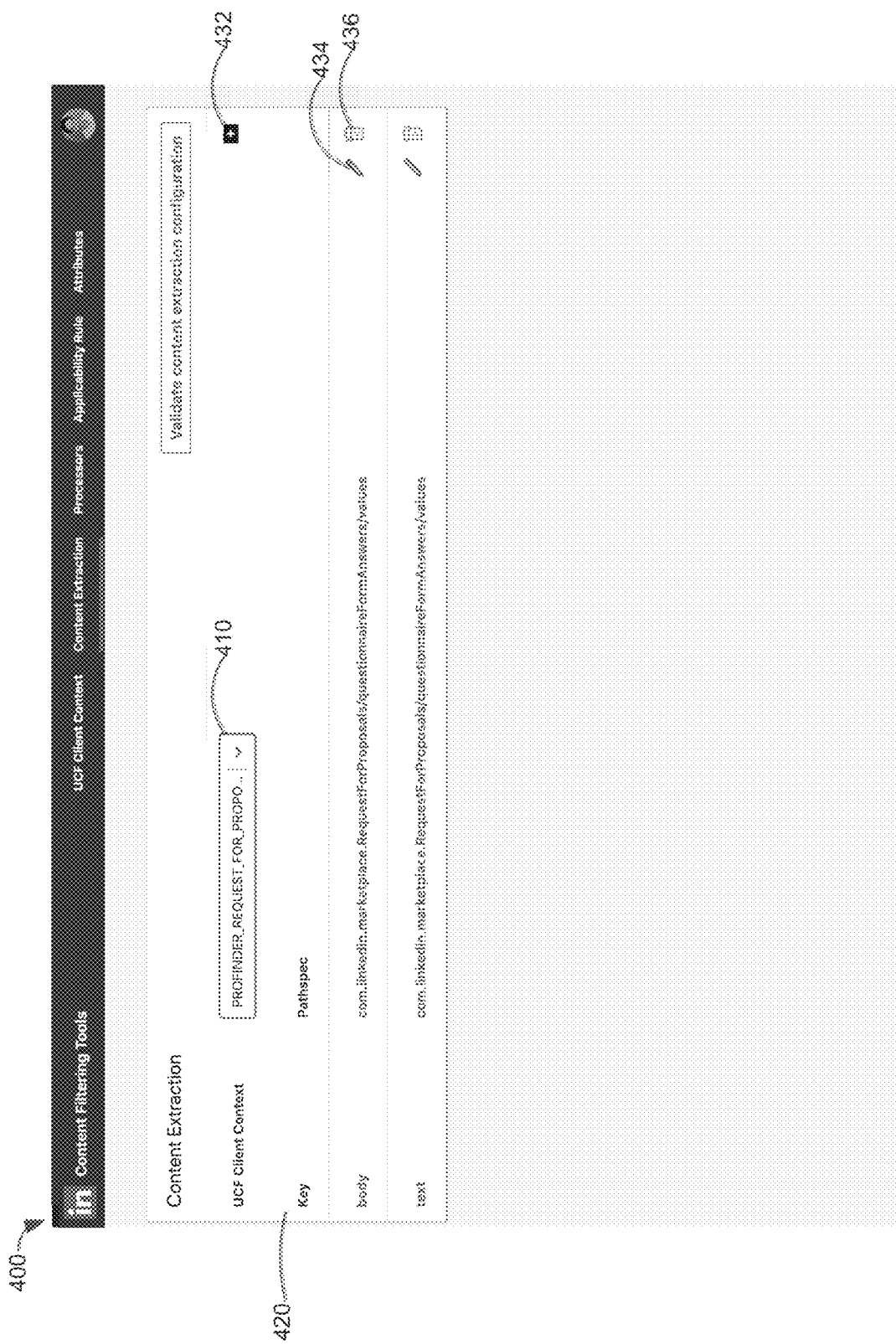
FIG. 4A-4D are screenshots of example user interfaces for specifying one or more content extraction configurations, in an embodiment.

FIG. 4A is a screenshot of an example user interface 400 that allows users to specify one or more content extraction configurations, in an embodiment. User interface 400 includes a dropdown menu 410 for selecting a UCF client context. Once a UCF client context has been selected, a key-pathspec mapping 420 is displayed. In this example, key-pathspec mapping 420 includes multiple keys, each key associated with a different pathspec (or "path specification") . There are multiple key names. In this example, body and text are key names. Other example key names include title and mediaUrls. Classification services reference key names in their respective code, but, at runtime, leverage the applicable key-pathspec mappings in order to process the appropriate content. Such "leverage" may be performed by calling the feature extraction component and passing, as part of the call, a client context identifier and the content classification request. Alternatively, such leverage may be performed by using a content extraction configuration directly by first retrieving a content extraction configuration associated with the current client context and then using that configuration to extract the relevant content referenced by (e.g., found within) the content classification request.

Figure 4B:
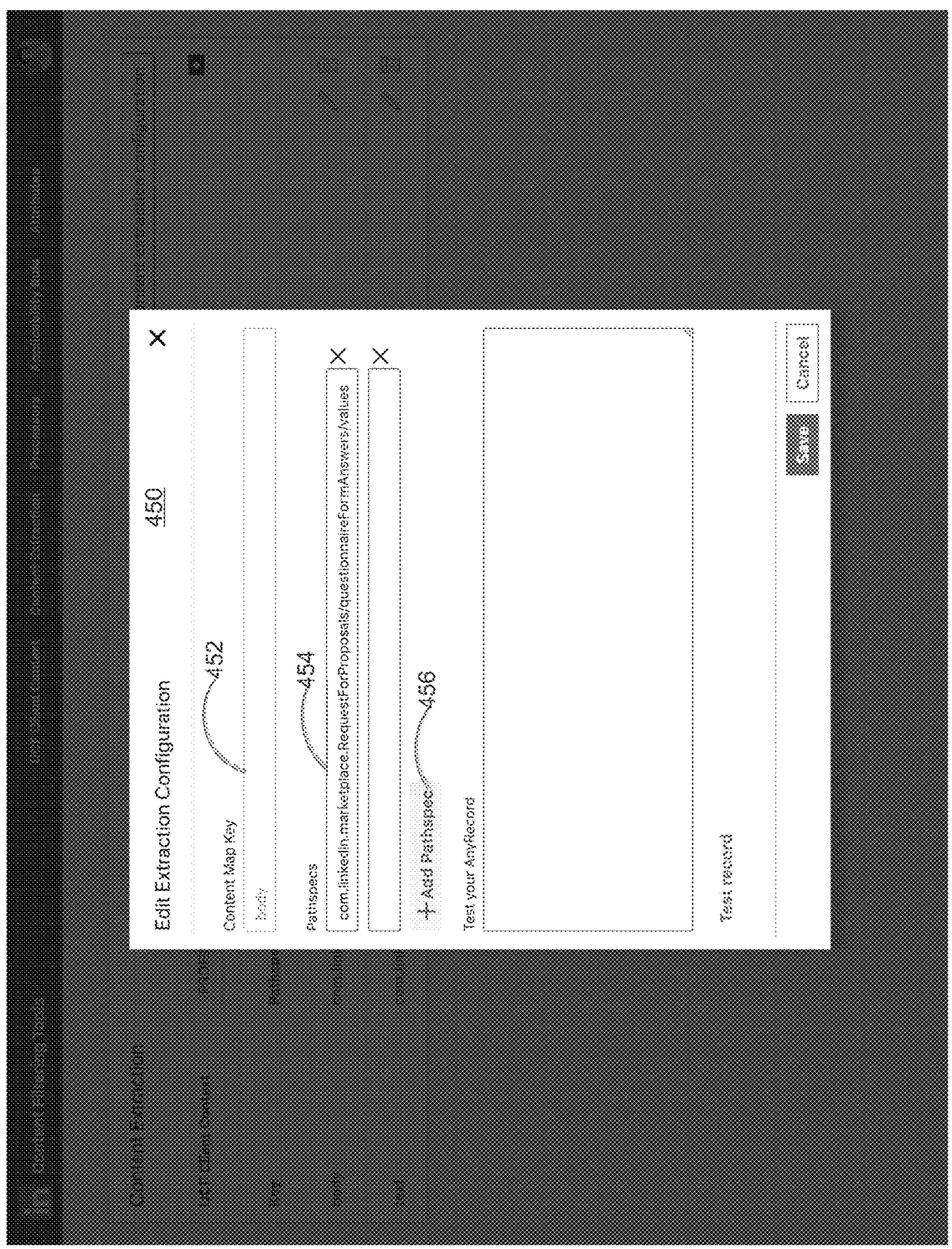

User interface 400 also includes an add button 432 and, for each key-pathspec mapping, an edit button 434 and a delete button 436. Selection of delete button 436 causes the correspond key-pathspec mapping to be deleted and removed from user interface 400. Selection of edit button 434 causes a user interface 450 be displayed, as depicted in FIG. 4B.

User interface 450 includes a field 452 for the map key, where the key name is currently "body." User interface 450 also includes the current pathspec 454 along with an add button 456 if the user desires to specify another pathspec for the current map key.

In an embodiment, a user interface associated with a client context displays a warning if backend 130 determines that a client context is not associated with a content extraction configuration. A client context may be associated with only a single content extraction configuration. Extraction configurations have Map<key, value> in which any number of key to be extracted can be defined.

The following is an example content extraction configuration that comprises a mapping of keys to respect path specification definitions:

| Key | Spec-definitions |
| --- | --- |
| Title | root/title |
| Message | root/message |
| Names | root/names/name |
| Body | [root/title, root/message, root/names/name] |

Figure 4C:
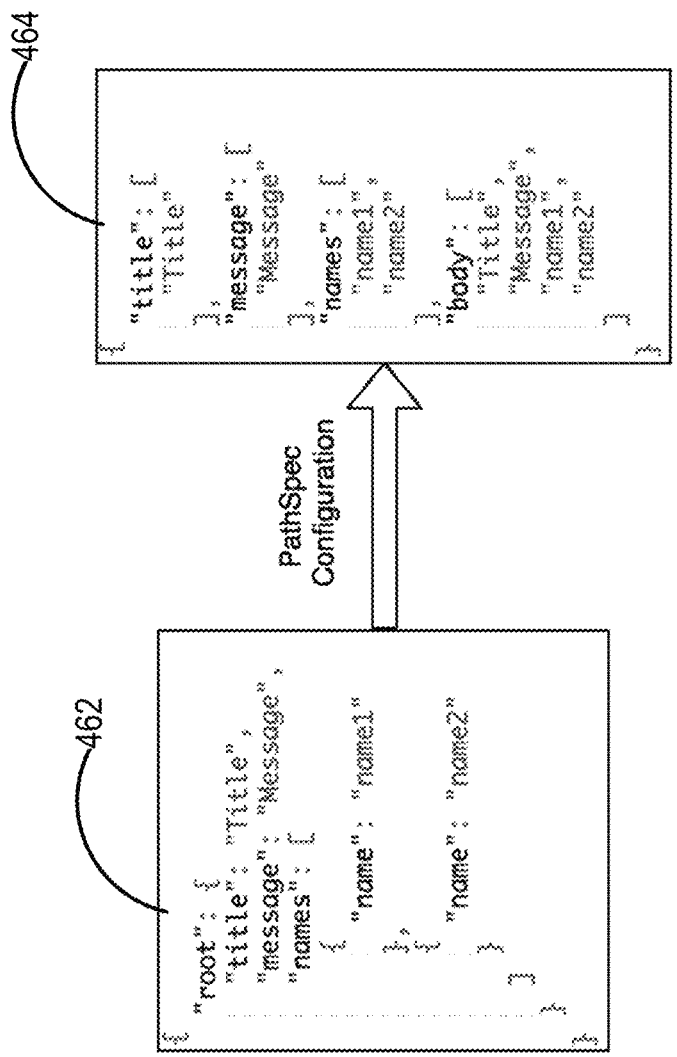

FIG. 4C is an example content extraction using the above content extraction configuration, in an embodiment. Element 462 refers to a data model of a content classification request while element 464 refers to a data model after applying the content extraction configuration to element 462. Thereafter, when a classification service applies the content extraction configuration to a content classification request, the classification service is able to reference different portions of the content classification request using existing code that only references the key value and not any of the path specification definitions since, when the classification service was composed, such path specification definitions were not known. Thus, with content extraction configurations, path specification definitions no longer need to be hardcoded in a classification service.

Figure 4D:
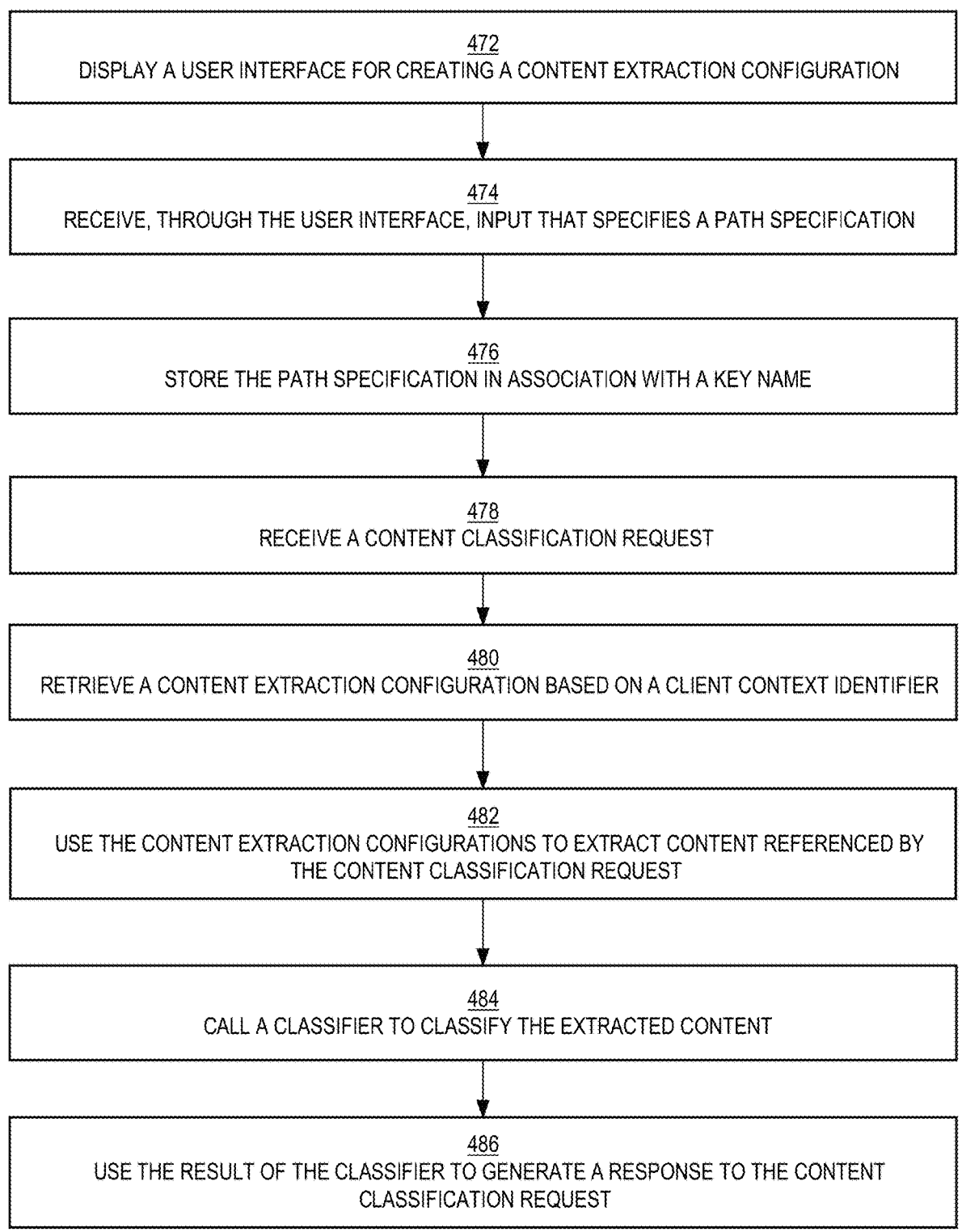

FIG. 4D is a flow diagram that depicts an example process 470 for leveraging a content extraction configuration, in an embodiment.

At block 472, a user interface for creating a content extraction configuration is displayed. Block 472 may be performed in response a request, from client 110, to create a content extraction configuration, such as a request that is generated when a user selects add button 432.

At block 474, input is received through the user interface that specifies a path specification. The user interface may display pre-defined key names and the input is with respect to a text field corresponding to one of those key names.

At block 476, the path specification is stored in association with the corresponding key name and a client context. For example, the mapping of the path specification to the key name is stored as a unit or tuple in data store 140. The mapping is considered a content extraction configuration. The mapping is stored in association with a particular client context via, for example, a client context identifier, which may be determined based on the identity of the user of client 110 (e.g., determined through an authorization process) or the current login credentials of client 110. The content extraction configuration may be stored in a cache accessible to ecosystem 150 prior to receipt of the request so that ecosystem 150 does not have to make a call to backend 130 for the content extraction configuration in response to a content classification request involving the context extraction configuration.

At block 478, a content classification request is received. Block 478 may be triggered by client 160 transmitting the content classification request to content classification ecosystem 150 or to classification service 152. The content classification request includes a client context identifier.

At block 480, based on the client context identifier, the content extraction configuration is retrieved. For example, a cache may store a mapping of client content identifiers to content extraction configurations.

At block 482, the content extraction configuration is used to extract content referenced by the content classification request. The content may be within the request or may be external to the request, in which case a reference, in the request, to the content is extracted and used to retrieve the content from an external source, such as outside content classification system 100. Blocks 480-482 may be performed by classification service 152 or a separate content extraction component. Importantly, no client-specific information is hard coded in the classification service 152 or the context extraction component.

At block 484, the classification service calls a classifier to classify the extracted content. The classifier may be rules-based classifier or a machine-learned classifier.

At block 486, a result of the classifier is used to generate a response to the content classification request. For example, the result may be one of multiple results that are produced by different classifiers that are called as a result of the content classification request.

Processors and Classifiers

Each client context relies on one or more classifiers to classify (e.g., user-generated) content and, optionally, one or more processors to process results of those classifiers in order for the corresponding client to make informed decisions.

A processor is a processing unit that processes input according to logic that the processor encapsulates. A processor is uniquely identified by an auto-generated identifier and/or by name and version number. Example field names and corresponding descriptions of a processor definition include the following:

| Field Name | Description |
| --- | --- |
| Id | Identifier of the processor (e.g., "P2") |
| Type of the processor | Type of the processor, such as regex matching, duplicate spam, logistic regression-based classifier, etc. |
| Parent Processor | This will be present if the processor is not the root processor |
| Name | Name of the processor |
| Version | Version of the processor |
| ClientId | The unique id for the domain (or client context) to which the content classification request belongs |
| Service | Classification service/subsystem to which the processor belongs. |
| State | State of the processor-ACTIVE, PASSIVE, DISABLED |
| Configuration | Extra configuration needed for the processor, such aggregation strategy such as AND, OR, NOT, or a custom aggregation. |

A processor may be a root processor, a parent processor, an intermediate processor, a child processor or a leaf processor. A processor tree has only one root processor and zero or more leaf processors. If a processor tree consists of only a single processor, then the single processor is a special case of leaf processor, in that the single processor runs or executes a classifier. Processors belonging to a specific client context are represented as a processor tree. Processors within a classification service/subsystem are created using a uniform interface (described in more detail herein) where a classification request and response are of the same type and associate configurations are stored in a processor registry (or database).

A leaf processor runs or executes a classifier, is itself a child processor, and has no child processors. A root processor is a special case of parent processor. An intermediate processor is both a parent processor to one or more child processors and is a child processor to a parent processor. A non-leaf processor (e.g., a root processor, a parent processor, or an intermediate processor) has one or more child processors. A non-leaf processor consumes (e.g., aggregates or transforms) responses from its child processors based on custom or pre-defined aggregation strategies. If a non-leaf processor is not the root processor, then the non-leaf processor passes its result to its parent processor, which may be the root processor.

A classifier is an indivisible unit of classification, such as a machine learned classifier or a rule-based classifier, and scores content with its self-contained logic. A classifier determines a label for input content, such as spam/no spam, low quality/medium quality/high quality, and duplicate/no duplicate.

A classification service/subsystem is a part the content-filtering platform and is associated with a processor tree. Thus, if there are three classification services and a client context leverages all of them, then there may be three processor trees for that client context.

Figure 5:
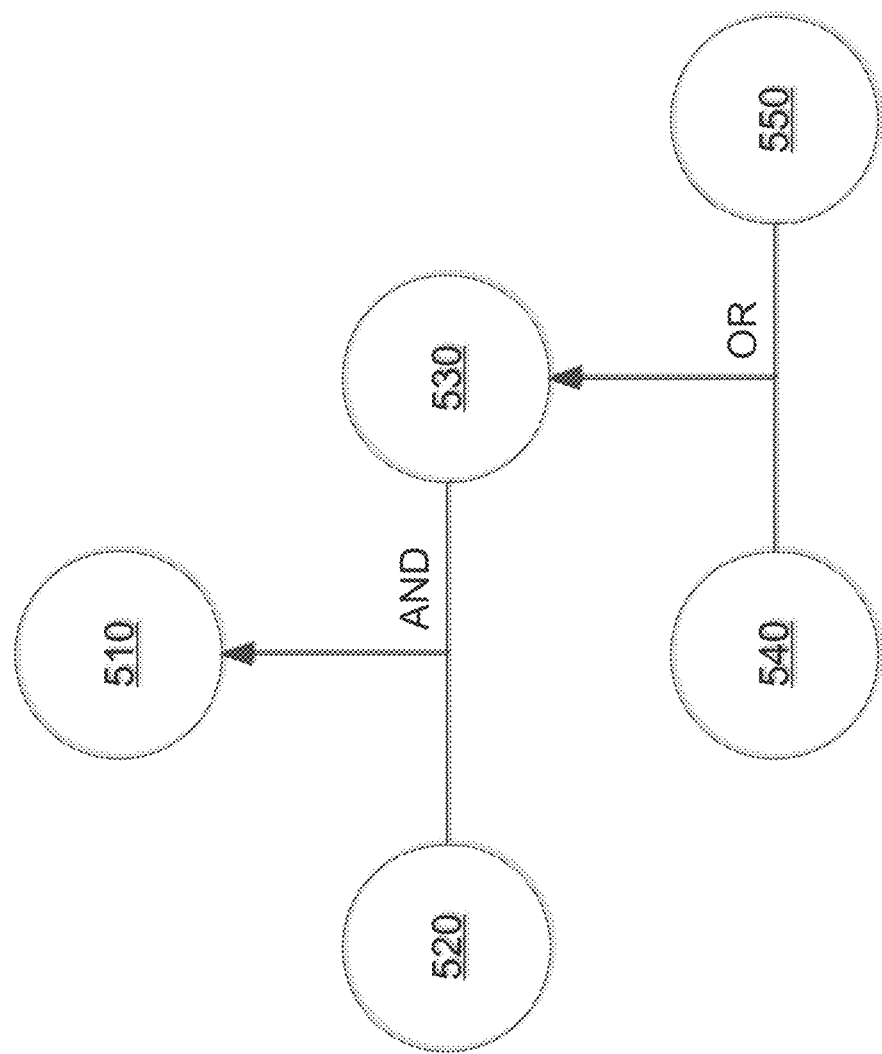
FIG. 5 is a block diagram of an example processor tree, in an embodiment.

FIG. 5 is a block diagram of an example processor tree 500, in an embodiment. Processor tree 500 includes processors 510-550. Leaf processors 540 and 550 run their respective classifiers based on content referenced by (e.g., included in) a content classification request, producing their respective results, and return the results to their parent processor, or intermediate processor 530. In response to a content classification request, all leaf processors in a processor tree may execute concurrently regardless of their respective depth in the processor tree. Processor 530 takes, as input, the results from leaf processors 540 and 550 and executes or performs an OR operation based on the input and returns the result to its parent processor, or root processor 510. Leaf processor 520 runs its classifier, producing a result, and returns the result to its parent processor, or root processor 510. Root processor 510 takes, as input, the results from processors 520-530 and performs an AND operation based on the input. The result of the AND operation is returned to a client device that transmitted the content classification request that initiated the execution of processors 510-550.

Viewing a Processor Tree Via the User Interface

Figure 6A:
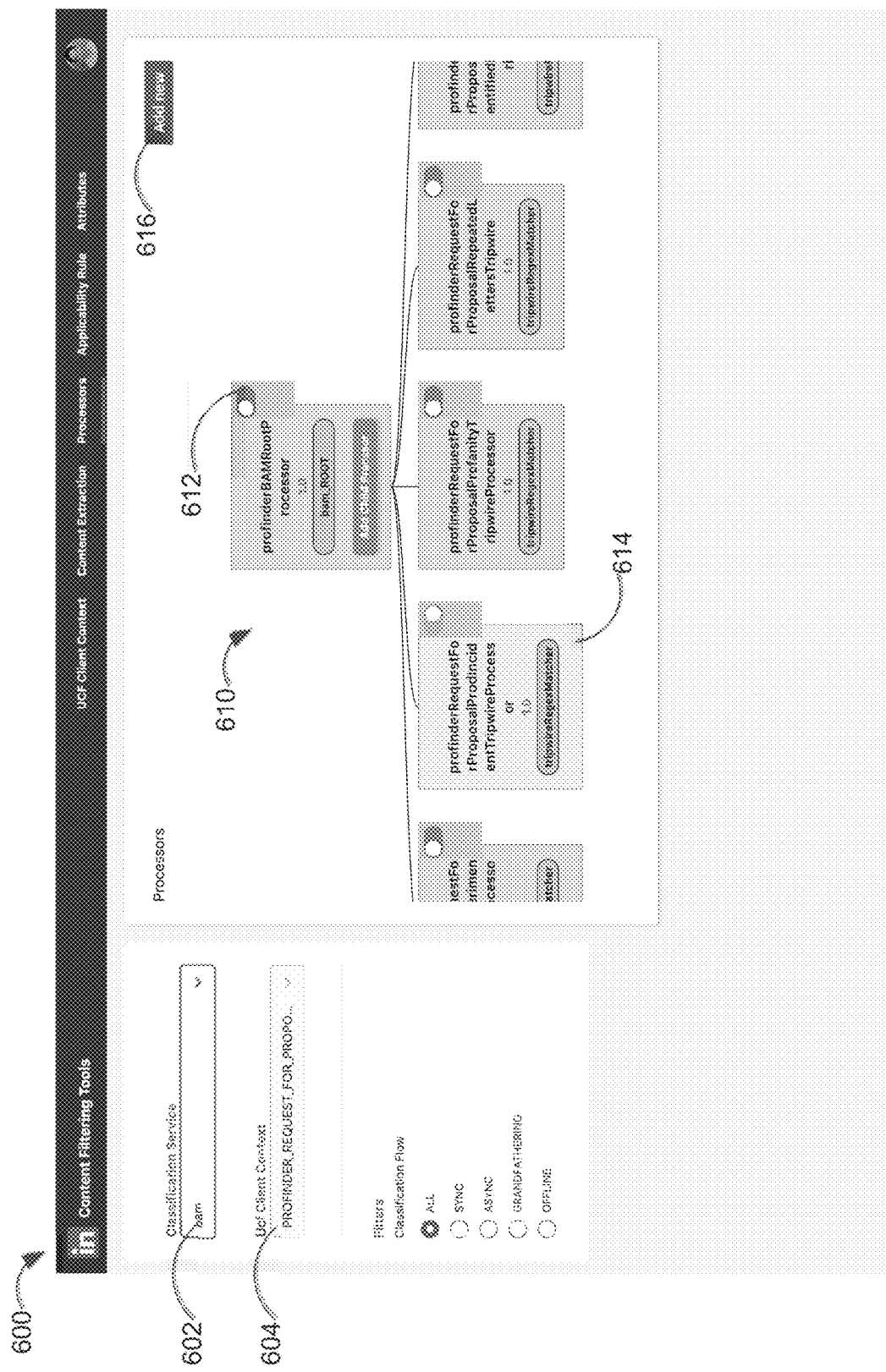
FIG. 6A-6F are screenshots of example user interfaces for viewing and modifying a processor tree, in an embodiment.

FIG. 6A is a screenshot of an example user interface 600 that allows a viewer to view and modify a processor tree 610, in an embodiment. User interface 600 includes a dropdown menu 602 for selecting a particular classification service (or subsystem) from among multiple available classification services. In this example, the classification service "bam" is selected.

User interface 600 also includes a dropdown menu 604 for selecting a particular client context from among multiple available client contexts. In certain scenarios, some user permissions allow a viewer to view all client contexts while other user permissions allow the user to view only a strict subset of client contexts. For example, a project manager of a particular client may be only able to view the client context corresponding to the particular client.

Processor tree 610 includes a single root processor and multiple (five) child/leaf processors. Each processor in processor tree 610 may have been visually selected for inclusion into processor tree 610 using a user interface provided by frontend 120 or unified dashboard 230. Each processor in processor tree 610 includes an activation switch 612 that indicates whether the corresponding processor is active. If activated, then the processor executes in response to a content classification request that is directed to processor tree 610. If not active, then the processor does not execute. In processor tree 610, only processor 614 is in the inactive state, while the other processors are in the active state.

User interface 600 also includes an add button 614 that, when selected by a viewer, causes another user interface to be displayed that allows the viewer to add another (existing) processor to processor tree 610.

In an embodiment, backend 130 includes a processor component (not depicted) that takes input specified through a user interface provided by frontend 120 and causes updates to be applied to data store 140.

Viewing and Editing a Processor Via the User Interface

Figure 6B:
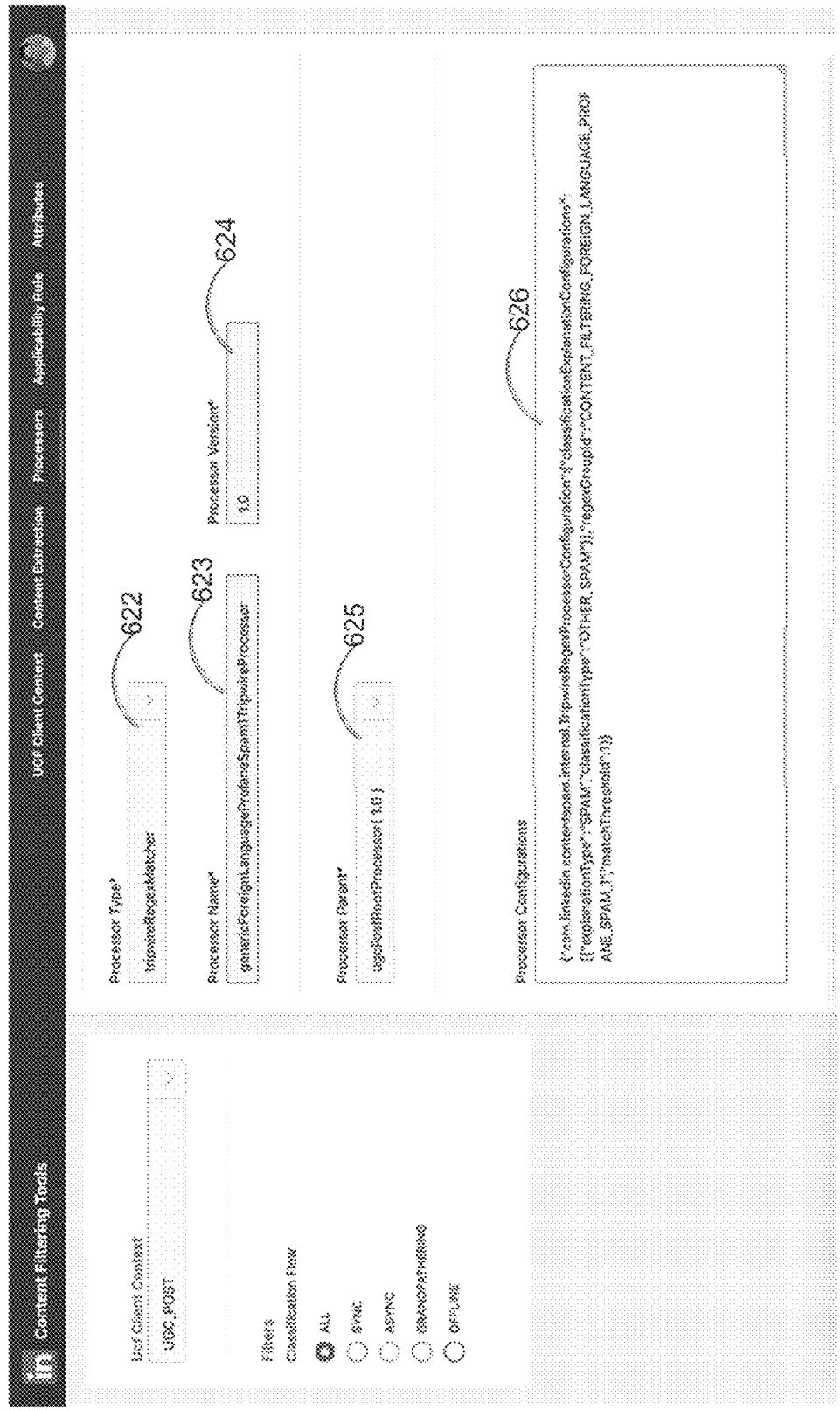

FIG. 6B is a screenshot of an example user interface 620 that allows a viewer to view and an existing processor, in an embodiment. User interface 620 is displayed in response to the viewer selecting the root processor in processor tree 610. User interface 620 lists the type 622 of the processor, the name 623 of the processor, the version of the processor, the parent (if any) of the processor (because the processor is a root processor, no parent processor is listed), and a listing of configurations 626 of the processor. In the depicted, a configuration of the processor includes an aggregation strategy where results returned by child processors are OR'd. User interface 630 may also include a discard button (not depicted) that, if selected, causes the processor to be deleted from processor tree 610.

Figure 6C:
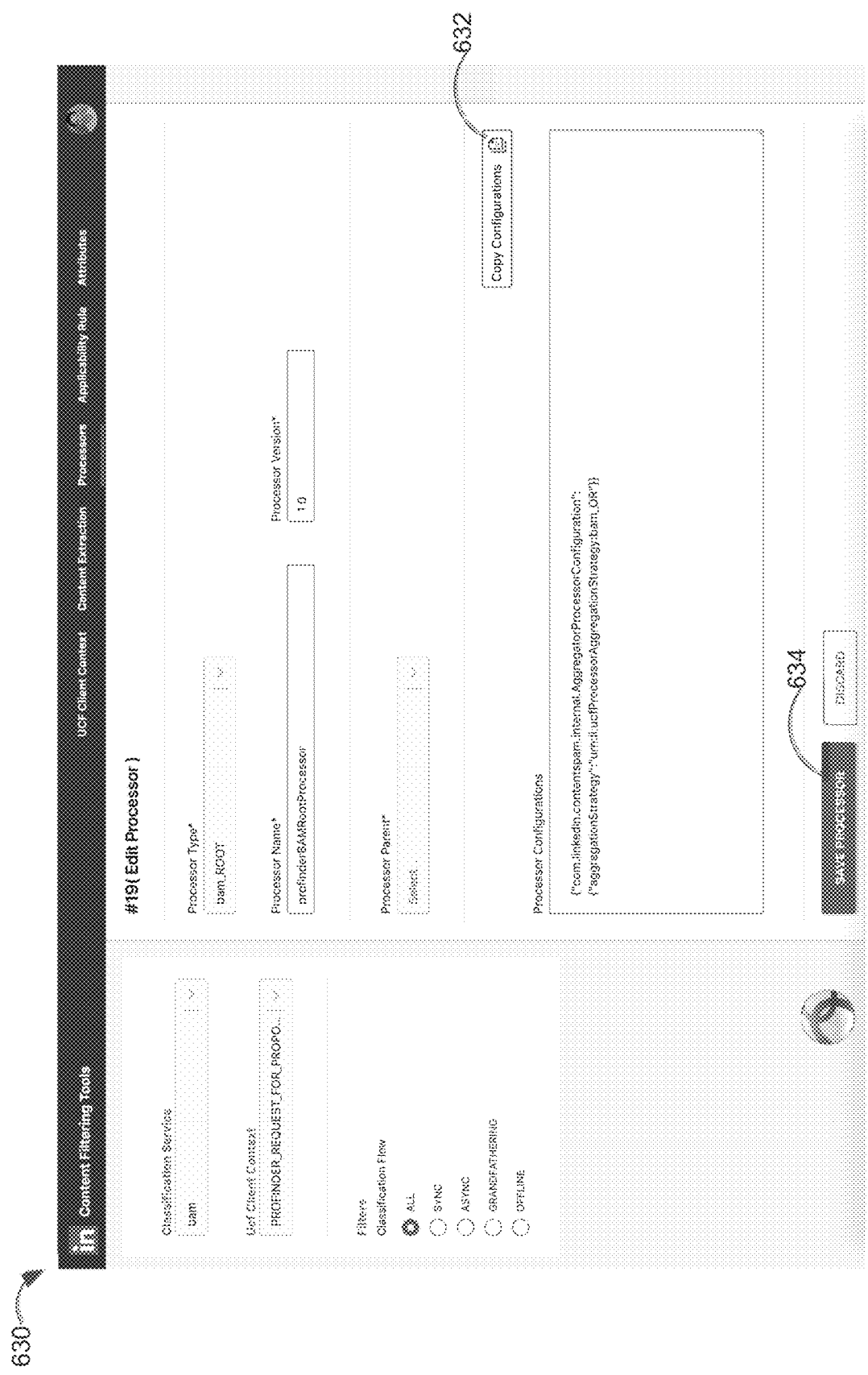

FIG. 6C is a screenshot of an example user interface 630 that allows a viewer to edit an existing processor, in an embodiment. User interface 630 includes a copy button 632 that, if selected, allows one or more configurations from existing processors to be copied into the currently displayed processor listing. The viewer may also modify the configurations (whether existing or the configurations copied from another processor) listed in the configurations field. User interface 630 also includes a save button 634 that, if selected, causes the edited configurations to be saved in association with the processor, which is associated, in data store 140, with a particular client context and, optionally, a particular classification service.

Creating a Processor Via the User Interface

A viewer (or user of a client context) may initiate creation of a processor or a processor tree in one or more ways.

Figure 6D:
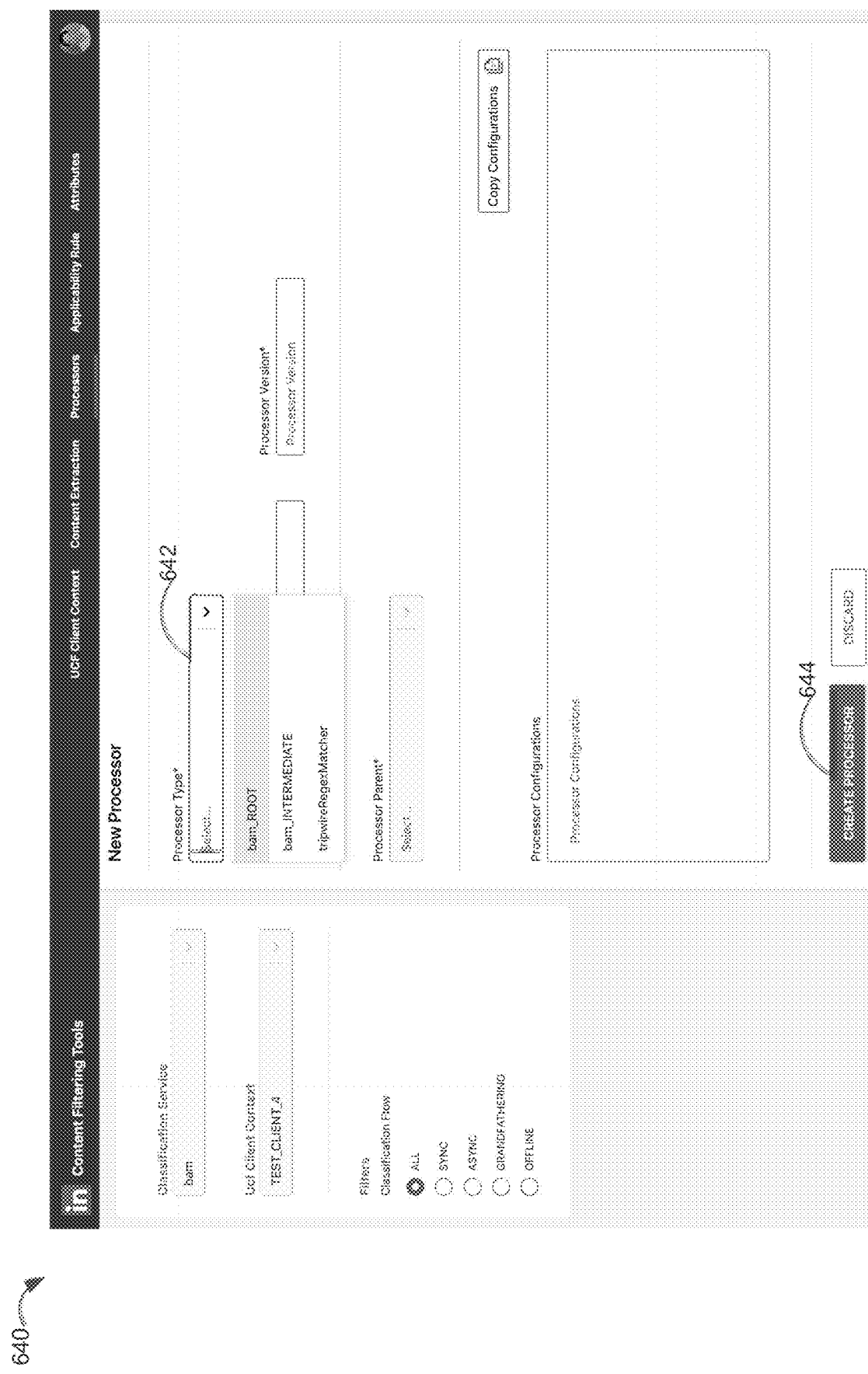

FIG. 6D is a screenshot of an example user interface 640 that allows a viewer to create a new processor, in an embodiment. User interface 640 includes a dropdown menu 642 for selecting a type of processor. In the depicted example, given the "bam" classification service, there are three processor types: a root type, an intermediate type, and leaf type labeled "tripwireRegexMatcher," which includes a classifier that matches pre-defined regular expressions to text or characters within content that is being classified as part of a content classification request.

A processor configuration may be varying information on which a classifier works. Processors configurations are for any type of processor and may be anything. For different types of processors (e.g., an aggregator or a wrapper over a root processor), different configurations may be defined. The following is an example configuration for a regex match processor:

```
RegexMatchProcessor:
{
  "name": "regexGroupId",
  "type": "string",
  "doc": "Identifier corresponding to the group of regexes to be matched"
}, {
  "name": "matchThreshold",
  "type": "int",
  "doc": "Threshold for pattern match count beyond which classifies the content as positive"
}, {
  "name": "applicableFields",
  "type": {
    "type": "array",
    "items": "com.linkedin.common.UcfContentExtractionFieldUrn"
  },
  "optional":true,
  "doc": "Content fields which will be used to match the patterns, if not present all values present in content record will be considered for classification"
}, {
  "name": "classificationExplanationConfigurations",
  "type": {
    "type": "array",
    "items": "ClassificationExplanationConfiguration"
```

},
"doc": "constant classification explanations for the processor to be added in response if content is found positive by the processor"
}

The following is an example of a configuration for a near duplicate spam detection processor:

```
NearDupeSpamDetectionProcessor:
{
"name": "ucfClientContextUrn",
"type": "com.linkedin.common.UcfContextUrn",
"optional":true,
"doc": "Used to override one in request for same blade runner recipe for multiple client context"
},
{
"name": "nearDupeThreshold",
"type": "int",
"optional":true,
"doc": "Threshold for Content dissimilarity (calculated via Jaccard or edit distance), default will 1 if not present"
},
{
"name": "enabledSpamTypes",
"type": {
"type": "array",
"items": "com.linkedin.contentspam.SpamType"
},
"optional":true,
"doc": "If present checks near duplicates from specified spam types only otherwise all spam types are considered"
},
{
"name": "enabledLowQualityTypes",
"type": {
"type": "array",
"items": "com.linkedin.contentspam.SpamType"
},
"optional":true,
"doc": "If present checks near duplicates from specified LQ spam types only otherwise all spam types are considered"
},
{
"name": "filterDataIngestionStartTime",
"type": "long",
"optional"true,
"doc": "Near Duplicate Documents created only
after filterDataIngestionStartTime will be considered.
This is timestamp in milliseconds"
},
{
"name": "filterDataIngestionSpamTypeStartTimeOverride",
"type": {
"type": "map",
"values": "long"
},
"optional":true,
"doc": "This field contains a map with key as
com.linkedin.contentspam.SpamType and value as long. The long value represents the timestamp in milliseconds. Near Duplicate Documents created only after this long will be considered for the specific Spam Type mentioned in the key. If present this will override filterDataIngestionStartTime"
},
{
"name": "excludeSpamTypes",
"type": {
"type": "array",
"items": "com.linkedin.contentspam.SpamType"
},
"optional":true,
"doc": "This contains a set of excluded spam types."
},
{
"name": "classificationExplanationConfigurations",
"type": {
"type": "array",
"items": "ClassificationExplanationConfiguration"
},
"optional":true,
"doc": "constant classification explanations for the processor to be added in response if content is found positive by the processor"
}
```

User interface 640 also allows the viewer to specify a name, a version, a parent processor (optional), and configurations. User interface 640 also includes a create button 644 that creates a new processor for the corresponding client context by sending, in a create request to data store 140, the specified type of the new processor, the specified name of the new processor, the specified version of the new processor, one or more specified configurations of the new processor, and, optionally, a specified parent of the new processor. In this way, no new code (e.g., in a high level programming language, such as Python or C) is specified. Instead, the functionality of an existing classifier or processor is leveraged at runtime (using the client context information and associated configurations) in order to perform the functions requested by the client context.

Figure 6E:
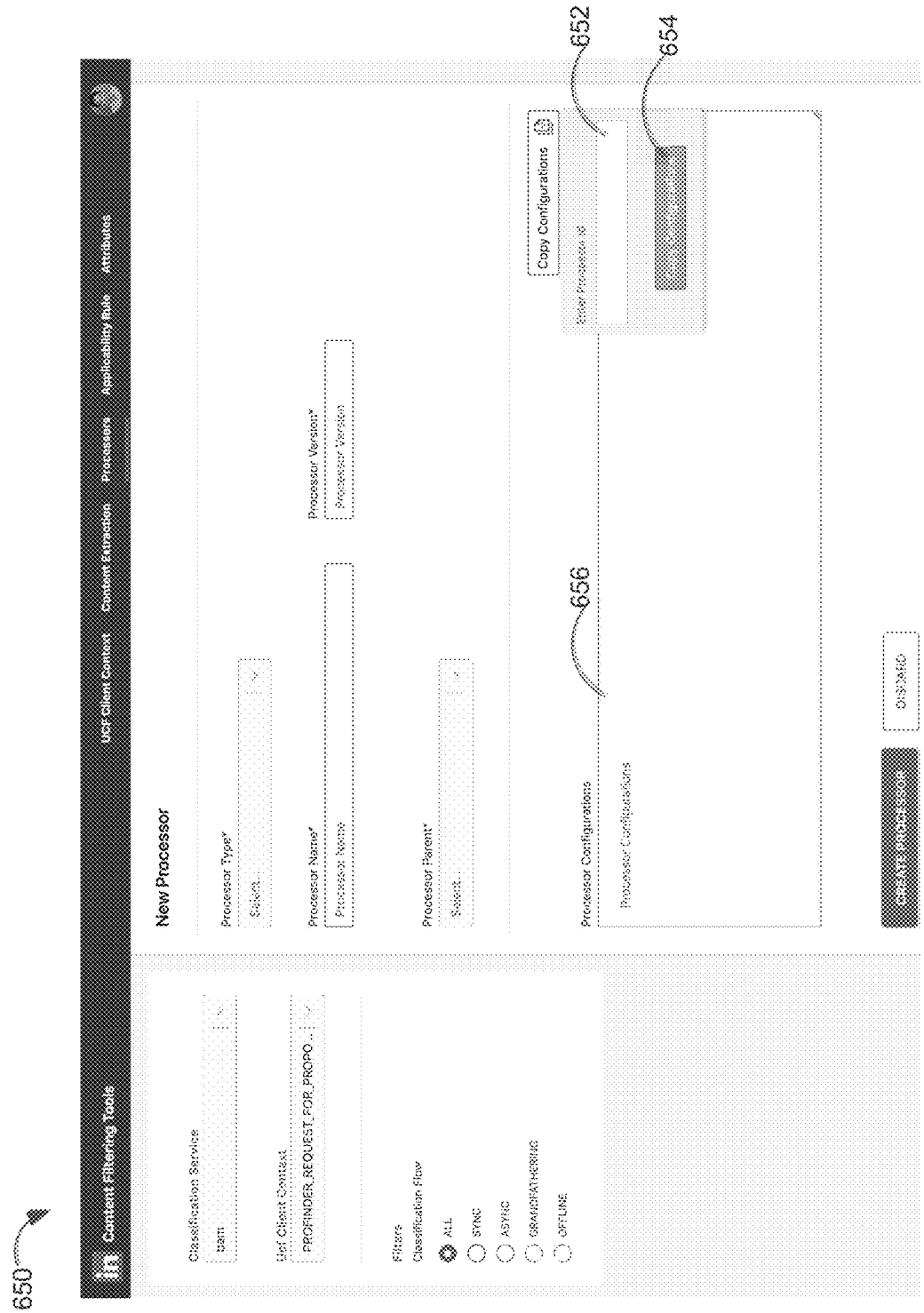

FIG. 6E is a screenshot of an example user interface 650 that allows a viewer to create a new processor, in an embodiment. User interface 650 includes a processor search field 652 for specifying a processor identifier, name, or other data that may be used to retrieve configurations of the corresponding processor. For example, if the viewer specifies "proc123" and a processor with the identifier "proc123" is listed in data store 140, then configurations (and, optionally, other information, such as name and version) may be retrieved from data store 140. For example, once a particular processor is identified based on the user input to processor search field 652, a viewer may select the copy button 654 that causes the configurations of the particular processor to be copied into configurations field 656.

Figure 6F:
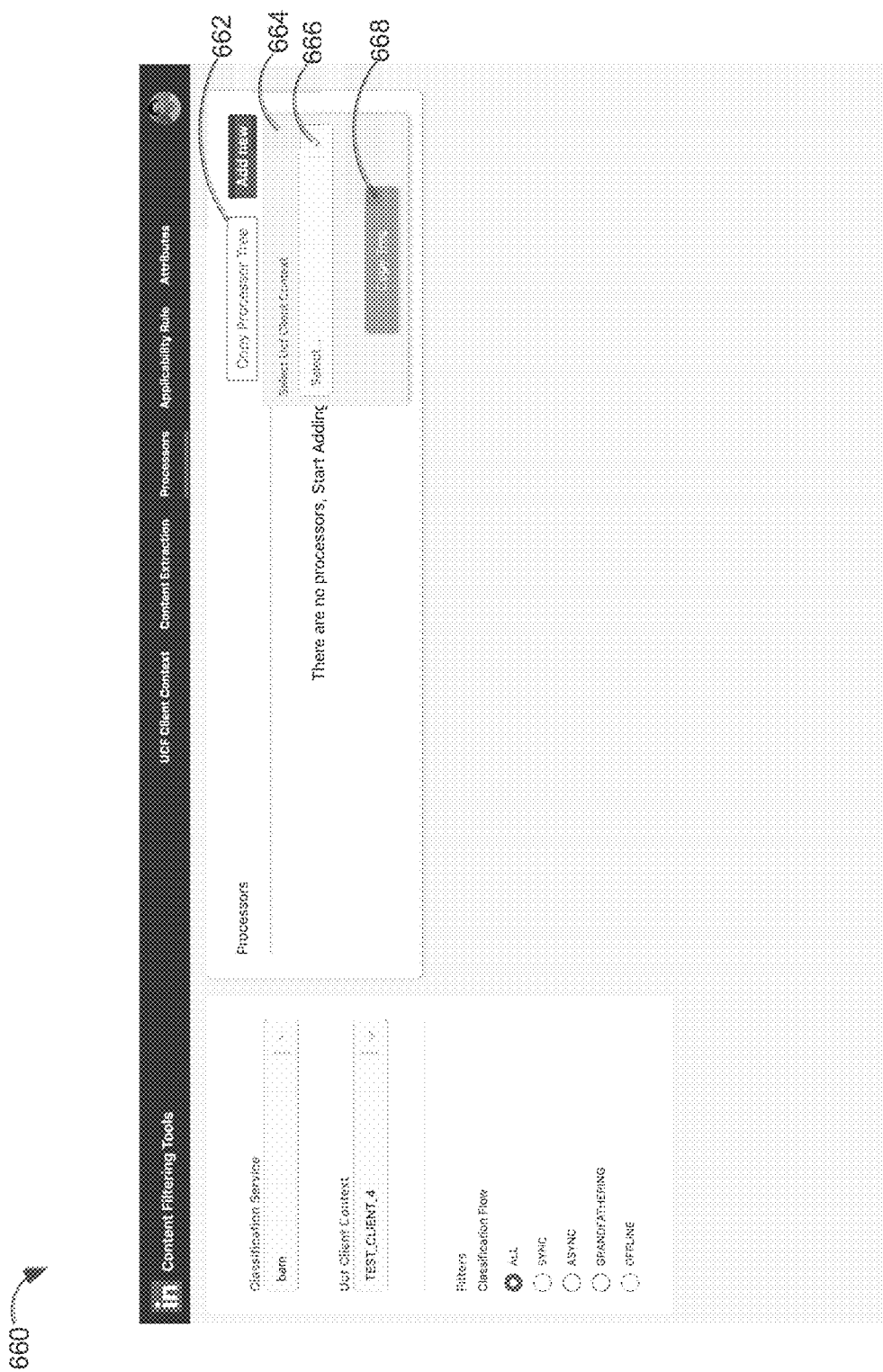

FIG. 6F is a screenshot of an example user interface 660 that allows a viewer to copy an existing processor tree from another client context, in an embodiment. In this way, a viewer (e.g., a client developer) does not need to create a processor tree from scratch. Instead, the viewer may leverage the work from others whose clients may have dealt (or currently deal) with similar, potentially bad, content. User interface 660 includes a copy tree button 662 that, when selected, causes window 664 to be displayed. Window 664 includes a dropdown menu 666 for selecting an existing client context. Once a particular client context is selected, viewer selection of copy tree button 668 causes the processor tree associated with the particular client context and the corresponding classification service ("bam" in this example) to be copied for the current client context ("TEST_CLIENT_4") in this example.

Applicability Filters

In some scenarios, it may be useful to turn off (or deactivate) one or more processors or not provide, to a requesting client, a response generated by a processor. For example, if a content classification request pertains to content that is provided by a trusted member of an online network, then one or more processors may be bypassed or skipped altogether. As another example, there may be a desire to stop all processors of a particular type, because, for example, a significant bug or error in processors of that type has been detected. Thus, in an embodiment, one or more applicability filters are defined in order to filter out one or more processors or responses in response to one or more content classification requests.

In an embodiment, similar to selecting processors for a classification service, a user interface is provided that allows a user (e.g., a client developer or program manager) to specify one or more applicability filters in a self-serve manner. Thus, no code changes are required to any of the processors or classified. The rules dictating whether to run a processor may be created and edited dynamically in a self-serve manner using a unified user interface. Dynamically removing processors or responses in this way makes it possible to ramp a processor and to collect data from a processor without passing up results produced by the processor.

An applicability filter comprises one or more selection criteria and an action. If the one or more selection criteria of an applicability filter are satisfied, then the action is performed. Example actions include (1) not running or invoking a processor, (2) running the processor but not passing up a result produced by the processor, and (3) running the processor. This last action is an "affirmative" action, while the first two actions are "restrictive" actions, which represent exceptions to the norm of running the processor.

An applicability filter may be associated with a specific processor or a group of processors. If the latter, then, if the selection criteria of the applicability filter are satisfied, then the action is performed with respect to the group of processors. For example, if the action is to not run a group of processors, then none of the processors in the group are run when the applicability filter applies.

In some scenarios, multiple applicability filters may be applicable to a particular request or response. In an embodiment, different applicability filters are associated with different priorities or have a different salience. For example, if the selection criteria of a first applicability filter are satisfied with respect to a particular content classification request, the selection criteria of a second applicability filter are satisfied with respect to the particular content classification request, and the first applicability filter has a higher priority than the second applicability filter, then the action of the first applicability filter is performed and the action of the second applicability filter is ignored.

Figure 7A:
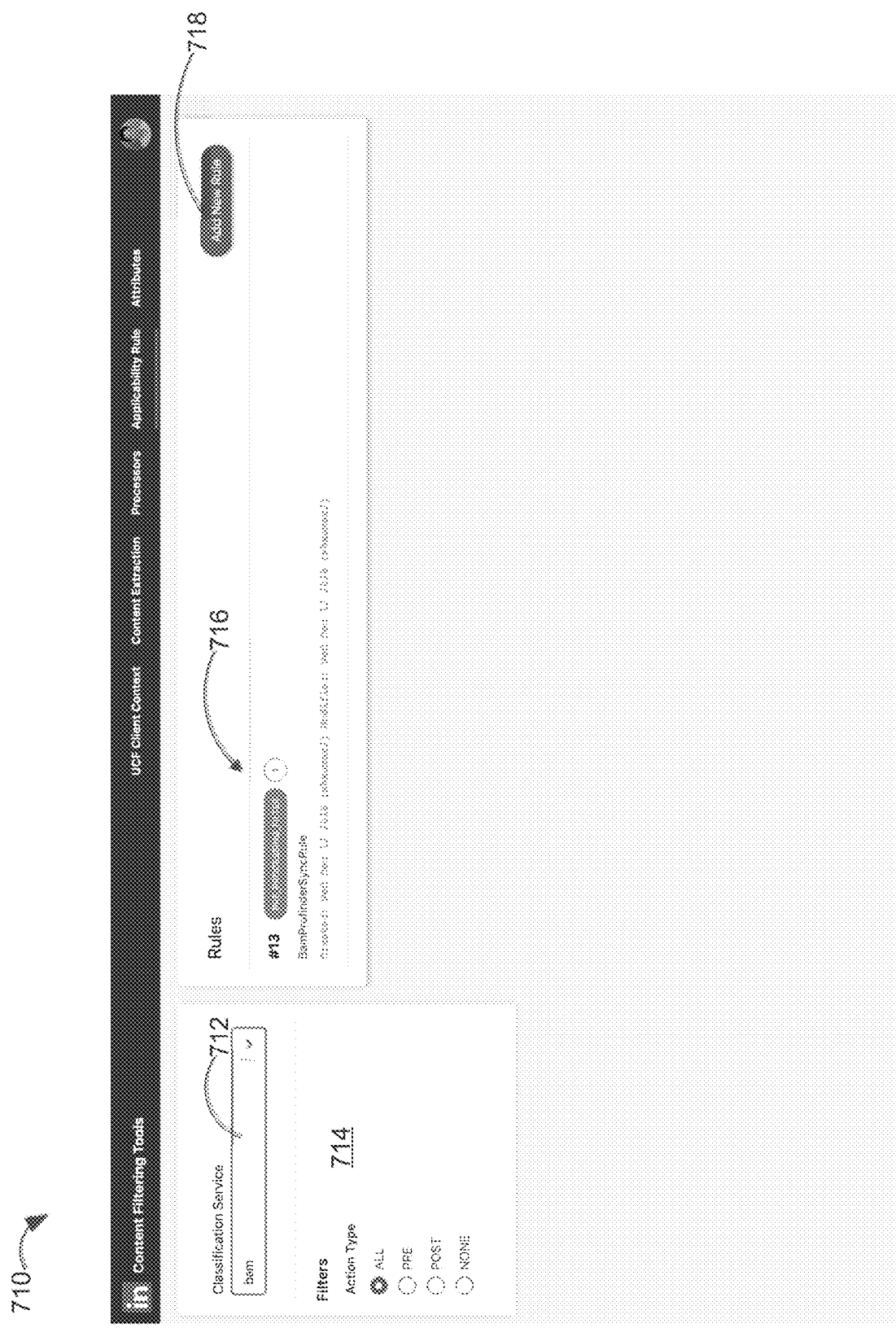
FIGS. 7A-7C are screenshots of example user interfaces for viewing and modifying applicability filters, in an embodiment.

FIG. 7A is a screenshot of an example user interface 710 for viewing applicability filters that have been defined or selected for a particular client context with respect to a particular classification service, in an embodiment. The classification service in this example is labeled "bam." Dropdown menu 712 allows the viewer to select a different classification service, which would update the user interface to display a set of zero or more applicability filters that are associated with the selected classification service (also with respect to the particular client context).

Filter selection area 714 lists three action types and a catch all "All." With the "All" option selected (e.g., by default), all applicability filters are displayed, regardless of action type. If the "PRE" action type is selected, then only applicability filters with an action of not running a processor are listed in the display. If the "POST" action type is selected, then only applicability filters with an action of running a processor but not passing up any results are listed in the display. If the "NONE" action type is selected, then only applicability filters with an action of running a processor are listed in the display.

Figure 7B:
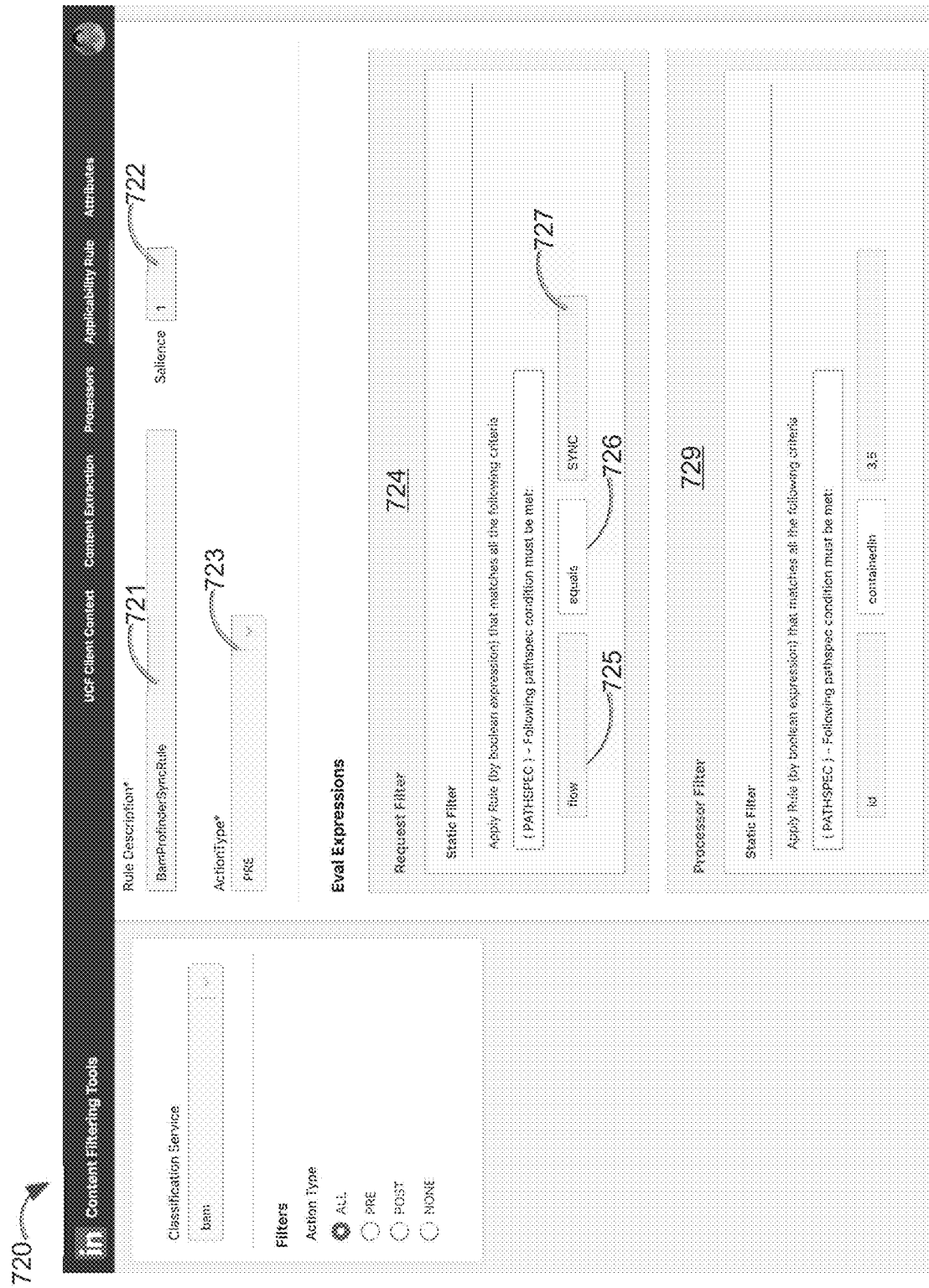

In the depicted example, only one applicability filter 716 is listed. The listing includes a name ("BamProfinderSyncRule"), a date on which the applicability filter was created, a name of the creator (or composer) of the applicability filter, a date on which the applicability filter was modified, a name of the modifier, an action type of the applicability filter ("PRE"), and a priority level ("1"). Viewer selection of the listing causes user interface 720 (depicted in FIG. 7B) to be presented.

User interface 710 also includes an add new rule button 718 that, if selected, causes user interface 730 (depicted in FIG. 7C) to be presented.

User interface 720 allows a viewer to view and update an applicability filter; in this example, an applicability filter corresponding to listing 716. User interface 720 presents a name or description 721 of the applicability filter, a salience 722 or priority of the applicability filter, and an action type 723 of the applicability filter. User interface 720 also includes two types of "sub" filters for this applicability filter: a request filter 724 and a processor filter 729. In a related embodiment, the applicability filter is also associated with a response filter (not depicted). Each "sub" filter includes one or more selection criteria. In an embodiment, all three types of sub filters need to return true in order for the associated action to be performed.

According to request filter 724, the selection criteria comprises a request attribute 725 (which is listed in a content classification request; which is "flow" in this example), an operator 726 (which is "equals" in this example), and an attribute value 727 (which is "SYNC" in this example). Thus, in this example, the selection criteria "flow=SYNC" must be satisfied in order for the PRE action (which is to not run the processor) to be applied to the request.

According to processor filter 729, the selection criteria "id contained in 3,5" (meaning the identifier of a processor must be either 3 or 5) must be satisfied in order for the PRE action (which is to not run the processor) to be applied to the request. If both the selection criteria of request filter 724 and processor filter 729 are satisfied, then the processors (namely, the processors with an identifier of 3 or 5) are not run with respect to the corresponding requests.

Figure 7C:
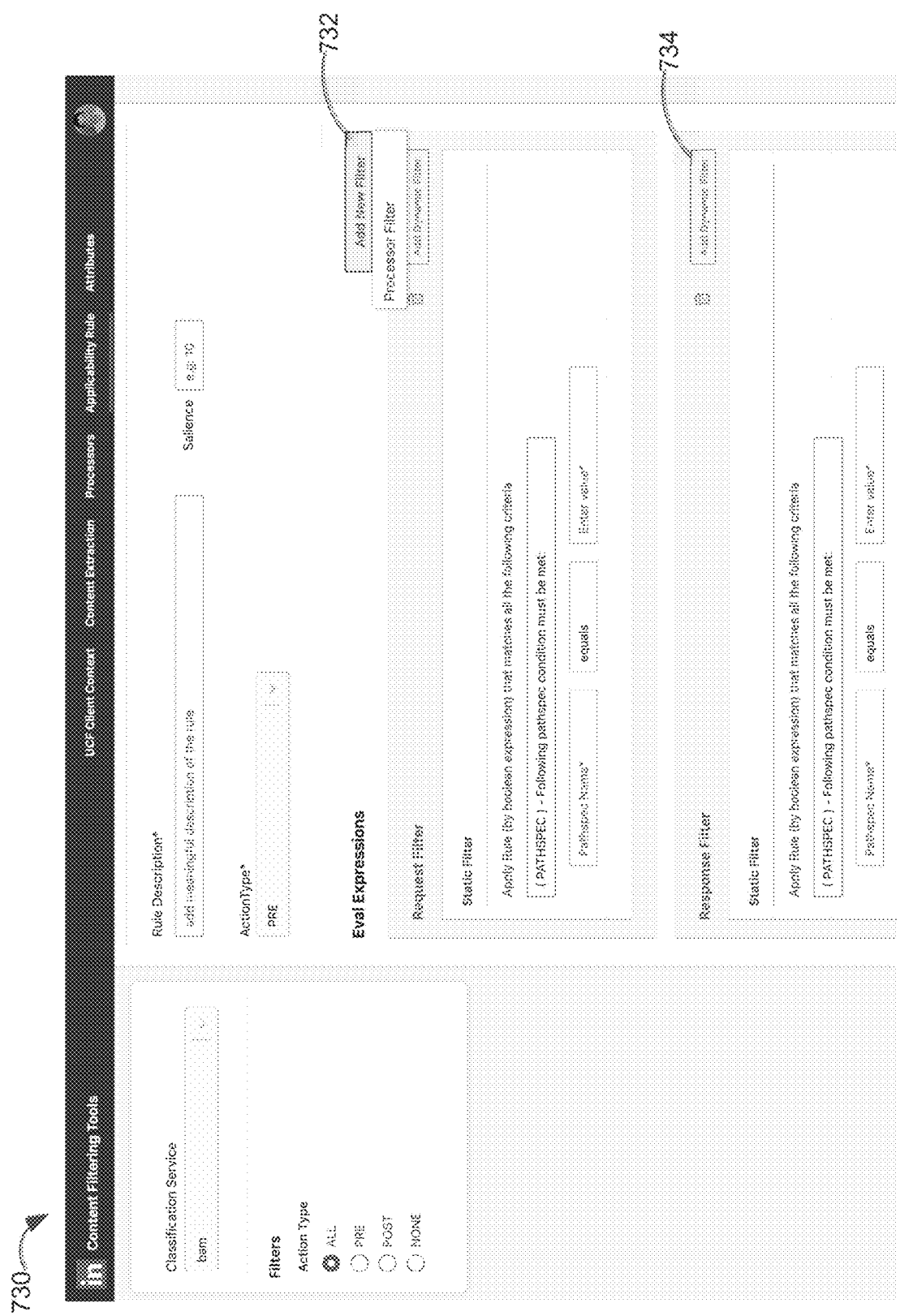

FIG. 7C is a screenshot of an example user interface 730 for creating a new applicability filter, in an embodiment. User interface 730 is similar to user interface 720, except that the name/description field is blank, the salience field is blank, the selection criteria for the different sub-filters are blank, a blank response filter is displayed, and no processor filter is displayed. If the selection criteria for the request filter and the response filter are satisfied and no processor filter is indicated, then either no processor (associated with the current client context) is run or all processors (associated with the current client context) are run. If all three types of sub filters are defined and the selection criteria for the request filter, the processor filter, and the response filter are all satisfied, then either none of the indicated processors is run or all of the indicated processors are run.

In the depicted example, only a request filter and a response filter are indicated in user interface 730. User interface 730 includes an add new filter button 732 that, when selected, causes a "Processor Filter" option to be presented. If selected, then a processor filter is included in user interface 730 along with UI elements to specify selection criteria.

User interface 730 also includes an add dynamic filter button (e.g., button 734) that, when selected, adds a dynamic filter to the corresponding sub filter. For example, if filter button 734 is selected, then a dynamic filter is included with the response filter (and adjacent to the depicted static filter).

On the other hand, if the filter button within the request filter is selected, then a dynamic filter is included with the request filter.

A static filter is one that is dependent on the entity and does not change with time. An "entity" may be any property of a classification request, such as classificationFlow, contentCreator, isInfluencer, Id, or properties of processors (e.g., id, type, stateless/stateful) which are plugged in for the ucfClientContext of the classification request. A dynamic filter is one that is dependent on external factors, such as AB experiments.

Applicability Filter Grammar

The following is an example grammar applicability rules.

```
apfRule: '<processorFilter>' processorFilter=filter '</processorFilter>'
'<requestFilter>' requestFilter=filter '</requestFilter>' '<responseFilter>'
responseFilter=filter '</responseFilter>';
filter: '<staticFilter>' staticFilter=filterExpr '</staticFilter>'
'<dynamicFilter>' dynamicFilter=filterExpr '</dynamicFilter>';
filterExpr:
'<filterExpr>' stringFilterExpr '</filterExpr>'
| '<filterExpr>' notFilterExpression '</filterExpr>'
| '<filterExpr>' alwaysTrueExpression '</filterExpr>'
| '<filterExpr>' alwaysFalseExpression '</filterExpr>'
| '<filterExpr>' andFilterExpression '</filterExpr>'
| '<filterExpr>' orFilterExpression '</filterExpr>'
;
notFilterExpression: NOT filterExpr;
andFilterExpression: AND operands;
orFilterExpression: OR operands;
stringFilterExpr:
containsFilterExpr
  | equalityStringFilterExpr
  | nullStringFilterExpr ;
containsFilterExpr: pathSpec=pathSpecValue
CONTAINED_IN values=stringValues ;
equalityStringFilterExpr: pathSpec=pathSpecValue EQUALS
value=stringValue ;
nullStringFilterExpr: pathSpec=pathSpecValue IS_NULL ;
pathSpecValue: '<pathSpec>' STRING '</pathSpec>';
filterTypeValue: '<filterType>' FILTER_TYPE '</filterType>';
stringValues: '<values>' (stringValue)+ '</values>' ;
stringValue: '<value>' STRING '</value>';
operand: '<operand>' expr=filterExpr '<operand>'
operands: '<operands>' (operand)+ '</operands>'
alwaysTrueExpression: '<constant>true</constant>';
alwaysFalseExpression: '<constant>false</constant>';
NOT: '<opname>not</opname>' ;
CONTAINED_IN: '<opname>containedIn</opname>' ;
EQUALS: '<opname>equals</opname>' ;
IS_NULL: '<opname>isNull</opname>' ;
AND: '<opname>and</opname>';
OR: '<opname>or</opname>' ;
FILTER_TYPE: ('PRE_FILTER'| 'POST_FILTER' | 'NONE' ) ;
STRING: [#a-zA-Z0-9*+!:.:\-_?|]+;
WS: [ \t\n\r\n]+ -> skip;
```

The following is XML for describing three examples sub filters of an applicability filter, which XML may be stored in data store 140 and in a cache that is accessible to content classification ecosystem 150 in order to ensure fast retrieval and real-time processing:

```
<rule>
  <processorFilter>
    <staticFilter>
      <filterExpr>
        <pathSpec>flow</pathSpec>
        <opname>containedIn</opname>
        <values>
          <value>SYNC</value>
          <value>ASYNC</value>
        </values>
      </filterExpr>
    </staticFilter>
    <dynamicFilter>
      <filterExpr>
        <pathSpec>influencer</pathSpec>
        <opname>isNull</opname>
      </filterExpr>
    </dynamicFilter>
  </processorFilter>
  <requestFilter>
    <staticFilter>
      <filterExpr>
        <opname>not</opname>
        <filterExpr>
          <constant>false</constant>
        </filterExpr>
      </filterExpr>
    </staticFilter>
    <dynamicFilter>
      <filterExpr>
        <opname>or</opname>
        <operands>
          <operand>
            <filterExpr>
              <pathSpec>flow</pathSpec>
              <opname>equals</opname>
              <value>ASYNC</value>
            </filterExpr>
          </operand>
          <operand>
            <filterExpr>
              <pathSpec>influencer</pathSpec>
              <opname>isNull</opname>
            </filterExpr>
          </operand>
        </operands>
      </filterExpr>
    </dynamicFilter>
  </requestFilter>
  <responseFilter>
    <staticFilter>
      <filterExpr>
        <constant>true</constant>
      </filterExpr>
    </staticFilter>
    <dynamicFilter>
      <filterExpr>
        <constant>true</constant>
      </filterExpr>
    </dynamicFilter>
  </responseFilter>
</rule>
```

Example Process for Processing a Content Classification Request

Figure 8:
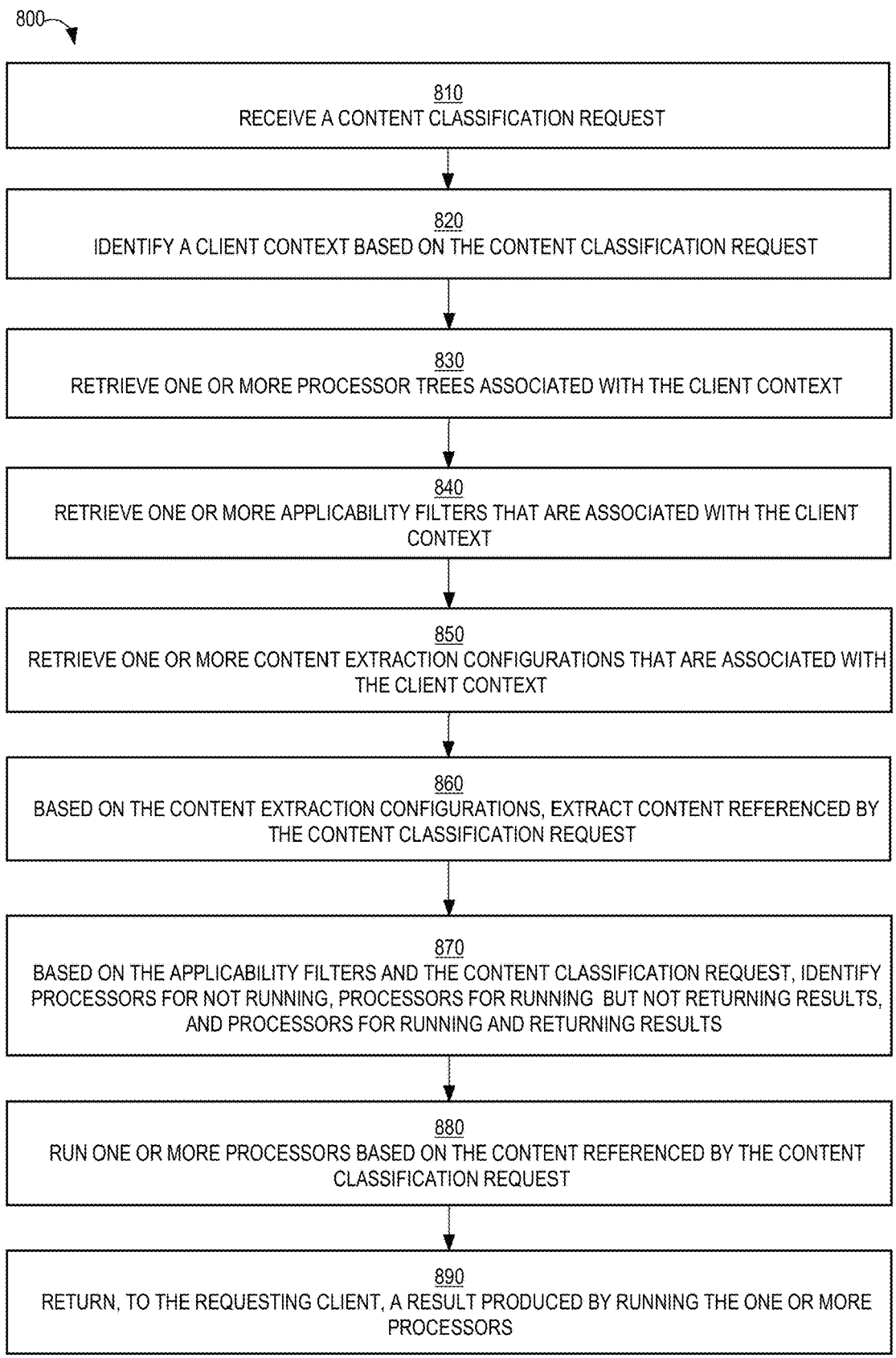
FIG. 8 is a flow diagram that depicts an example process for processing a content classification request, in an embodiment.

FIG. 8 is a flow diagram that depicts an example process 800 for processing a content classification request, in an embodiment. Process 800 is performed by content classification ecosystem 150.

At block 810, a content classification request is received. The content classification request may be transmitted by requesting client 160.

At block 820, a client context is identified based on the content classification request. For example, the content classification request may include a client context identifier.

At block 830, one or more processor trees that are associated with the identified client context are retrieved. For example, each client context is associated with a different set of processor trees. Also, multiple classification services may be invoked by the content classification request, where each classification service is associated with a different processor tree. A client context identifier is used to look up (e.g., in a local cache) one or more processor trees associated with that identifier.

At block 840, one or more applicability filters that are associated with the identified client context are retrieved. For example, each client context is associated with a different set of applicability filters. A client context identifier is used to look up (e.g., in a local cache) any applicability filters associated with that identifier.

At block 850, one or more content extraction configurations that are associated with the identified client context are retrieved. For example, each client context is associated with a different set of content extraction configurations. A client context identifier is used to look up (e.g., in a local cache) the content extraction configurations associated with that identifier.

Blocks 830-850 may be performed in any order.

At block 860, based on the content extraction configurations, content from the content classification request is extracted. Some of the extracted content may actually come from sources other than the content classification request, such as a content item database (not depicted) or a user profile database (also not depicted).

At block 870, based on the applicability filters and the content classification request, a first set of processors is identified for not running, a second set of processors is identified for running but not returning any results, and/or a third set of processors is identified for running and returning results. One or more of these sets of processors may be empty or may include one or more processors.

At block 880, one or more processors (i.e., in the second and third sets of processors) are run against content referenced in the content classification request. The one or more processors generate a result. Block 880 may involve multiple leaf processors running multiple classifiers and results of those classifiers being passed to a parent processor, of the leaf processors, that aggregates the results to produce a single result, which may be passed to another parent processor, if one exists.

At block 890, the result produced by running the one or more processors is returned to the requesting client. For example, content classification ecosystem 150 sends a response over a network to requesting client 160.

Aggregation Strategies

Figure 9A:
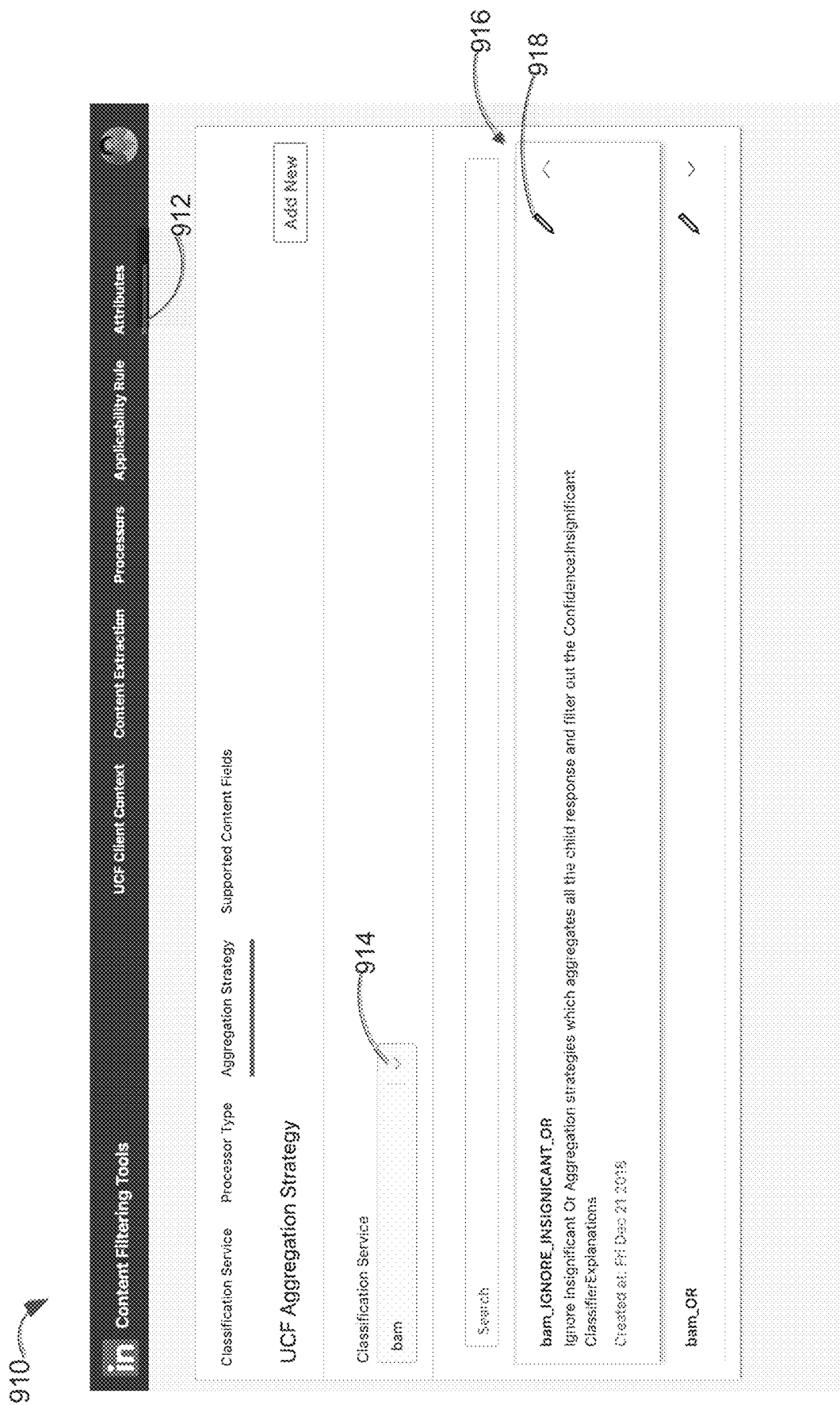
FIGS. 9A-9D are screenshots of other examples user interface for modifying data associated with a content classification platform, in an embodiment.

FIG. 9A is a screenshot of an example user interface 910 that lists zero or more aggregation strategies for a particular classification service, in an embodiment. An aggregation strategy is a description of an overall strategy that is followed in aggregating responses from multiple processors in a processor tree. Aggregation strategies are generic and may be used in any client context and in intermediate and root processors. Aggregation strategies comprise an identifier for aggregation logic lambda. Thus, according to an aggregation strategy defined for a processor, a corresponding lambda aggregates the responses from child processors in a different fashion. For example, an OR aggregation strategy has a corresponding lambda which will add the child responses in a final response. Similarly, for an AND aggregation strategy, the corresponding lambda will add child responses in a final response only if all the child responses are positive (indicating spam/low quality).

The actual aggregation(s) may be specified in one or more individual parent processors. However, a description of the overall aggregation strategy is found, in this example, under Attributes tab 912 of the user interface in order to allow each stakeholder associated with a client context to view any specified aggregation strategies of the client context.

Aggregation strategies may be stored in data store 140 and are retrieved and saved through backend 130 and displayed through frontend 120. Each aggregation strategy is stored in association with a particular client context and, optionally, a particular classification service. Thus, users who interact with content classification system 100 using privileges of a particular client context will be able to view (and, optionally, add and modify) aggregation strategies of that client context.

User interface 910 includes a dropdown menu 914 for selecting another classification service. If a different classification service is selected, then a list of zero or more aggregation strategies is presented in place of the currently presented listing.

Figure 9B:
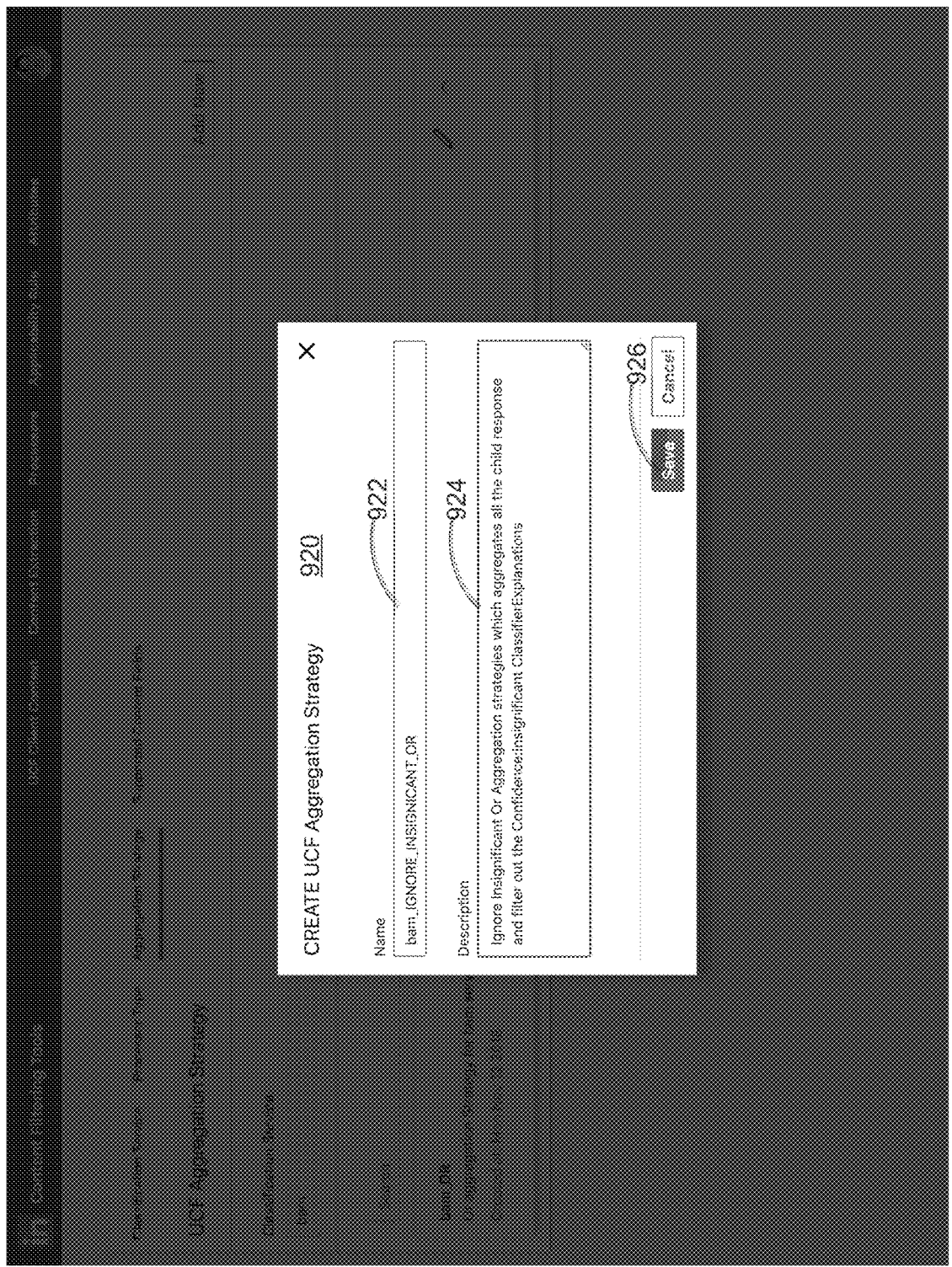

User interface 910 includes a listing 916 of aggregation strategies. Each listed aggregation strategy is associated with an edit button. The first listed aggregation strategy includes a name of the aggregation strategy, a description of the aggregation strategy, and a date on which the aggregation strategy was listed. Selection of edit button 918 causes popup user interface 920 to be presented, as depicted in FIG. 9B. User interface 920 includes a name field 922 for entering a name of an aggregation strategy, a description field 924 for entering a description of the aggregation strategy, and a save button 926 for saving the aggregation strategy.

Classification Services

Figure 9C:
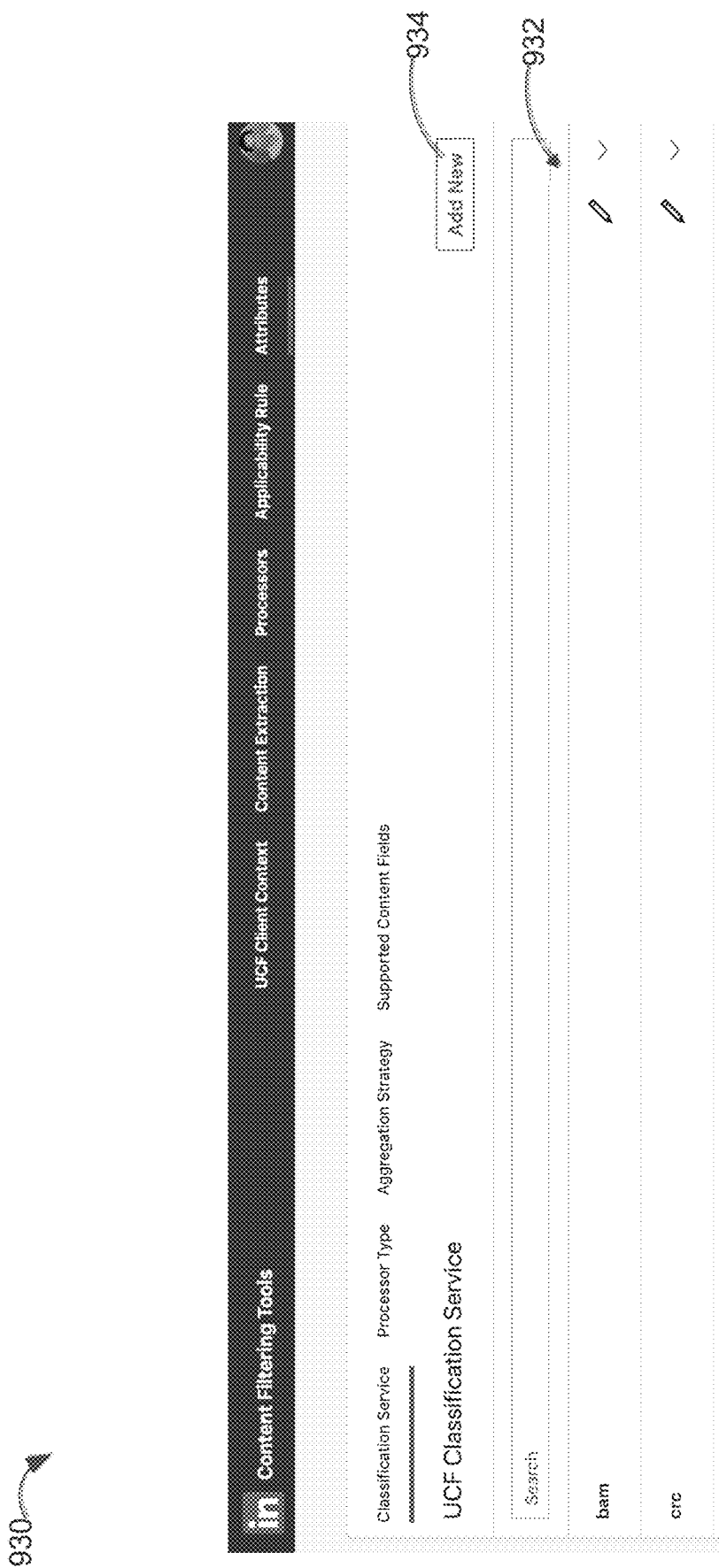

FIG. 9C is a screenshot of an example user interface 930 for viewing and updating classification services, in an embodiment. User interface 930 includes a listing 932 of classification services. Each listing includes (1) an edit button to edit the classification service and (2) a view button to present additional information about the corresponding classification service. User interface 930 also includes an add new button 934 for adding a new classification service. Such a new classification service may be leveraged by potentially any user of content classification system 100.

Processor Types

Figure 9D:
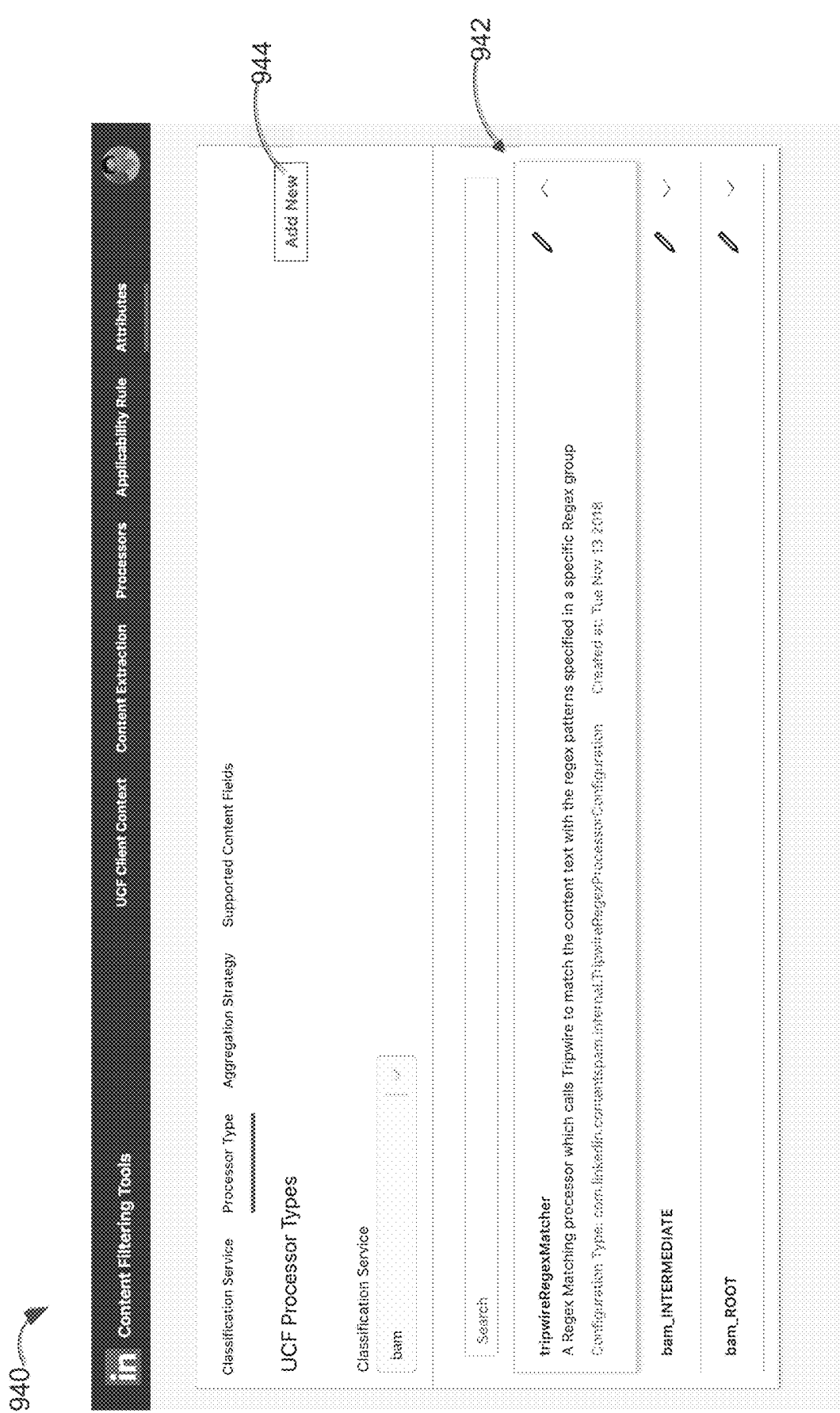

FIG. 9D is a screenshot of an example user interface 940 for viewing and updating processor types, in an embodiment. User interface 940 includes a listing 942 of the available types of processors given a particular classification service. In this example, the classification service is "bam." User selection of a classification service option corresponding to a different classification service will cause a different set of processor types to be presented in user interface 940. Each listing of a processor type includes (1) an edit button to edit the processor type and (2) a view button to present additional information about the corresponding processor type, such as a description of the processor type and a date on which the processor type was created. User interface 940 also includes an add new button 944 for adding a new processor type. Such a new processor type may be leveraged by potentially any user of content classification system 100.

Sampling

In an embodiment, content classification ecosystem 150 includes a sampling component that generates samples based on result produced as a result of content classification requests. The sampling component generates an event that is associated with a particular content item (e.g., using a content item identifier) and a processor. The event may indicate a timestamp of when the processor produced the result. The event may also indicate a label indicating the result (e.g., a classification produced by a corresponding classifier or an accept or deny label), and, optionally, a score and a confidence level indicating how confident the processor was in generating the result and/or the score. Sampling may be performed only for processors that comprise a classifier or for all types of processors.

Each event generated by the sampling component is consumed by a consumer process, which may be nearline, offline, or real-time. The consumer process may have access to sampling configurations that are specific to certain processors. For example, a sampling configuration for one processor may indicate that every tenth event be manually reviewed while a sampling configuration for another processor may indicate that every event associated with a particular classification be manually reviewed.

Content (and their associated classifications) associated with events that are assigned to a manual review queue are eventually viewed by a human user. Thus, a visual presentation to a human user based on an event may include the content associated with the event, the classification (e.g., bad, good, inappropriate, Class B), and optionally, a score and confidence level. A user interface that includes the visual presentation allows the user to indicate whether the classification was correct and, optionally, what the classification should have been. Thus, the user interface may include, based on the processor associated with the event, one or more other possible classifications or processor results.

The feedback provided by one or more human reviewers pertaining to a particular processor or classifier is used to generate one or more performance metrics of the processor/classifier, such as a precision measure and/or a recall measure. The performance metrics are stored in associated with the processor/classifier, for example, using a processor identifier. The performance metrics are provided to content classification ecosystem 150 and, for example, stored in data store 140.

A user (through one of clients 110-114) may request to view the performance metrics for individual processors or classifiers and/or for processor trees through, for example, unified dashboard 230. Thus, a displayed performance metric for a group of processors (e.g., a processor tree) may be based on aggregated performance metrics of individual processors within the group. Because a processor may be leveraged by multiple client contexts, performance metrics of a processor may be aggregated across client contexts or may be specific to a particular client context. For example, an aggregated performance metric may be computed for a particular processor with a certain name and version number, regardless of which client context uses the particular processor. As another example, an aggregated performance metric may be computed for all processors with a certain name but regardless of version number and regardless of which client context uses a processor with that name.

Metrics

In an embodiment, one or more components of content classification system 100 (e.g., a metrics component) may compute and provide metrics other than precision and recall. For example, each processor may generate an audit event that indicates a number of classifications of a particular type that the processor has determined. For example, one processor might generate an audit event when the processor detects spam in one content item and an audit event when the processor detects makes a low quality determination based on another content item. Each audit event may indicate not only the classification type but also the client context so that the metric component may generate processor-specific metrics, such as spam count and low quality count, by aggregating audit events (generated by a particular processor) based on classification type and, optionally, client context.

In an embodiment, a metrics component computes system level metrics, such as latency, error count, and memory issues. For example, a processor might report that an error occurred, a timestamp of when a result of the processor was produced, and any memory issues that arose. Regarding latency, a metrics component may record a time when a classification request is received and a time when a processor tree produces a result. A difference between the two times is considered a latency of the processor tree. Additionally or alternatively to computing such a latency, the metrics component records a time when a processor receives content of a classification request and a time when the processor produces a result. A difference between the two times is considered a latency of the processor.

As another example, the metrics component is used to determine a number of errors on a per processor basis, a per processor tree basis, and/or a per classification service basis.

In an embodiment, a metrics component generates an audit event whenever a change to a processor's configuration is made. Thus, a historical audit of each processor is enabled. Additionally or alternatively, a metrics component tracks changes to applicability filters, content extraction configurations, client context configurations, and aggregation strategies.

In an embodiment, a metrics component generates a report based on user flagging events. A user flagging event is one where a user flagged (or marked or identified) a content item that was inappropriate, a repeat, or otherwise violates content policies of the corresponding content hosting platform. Thus, a user flagging event is associated with a particular content item. Based on a user flagging event, it can be determined which processor, processor tree, and/or classification service processed the corresponding content item. A report may be generated that indicates how well one or more processors or classification services performed. Such a report may report an absolute number of flagging events and/or a percentage of processed content items that were ultimately associated with a user flagging event.

Configurable Privacy Modes

In an embodiment, content classification system 100 allows users to configure privacy modes. This feature is important in light of GDPR (General Data Protection Regulation). An important requirement with the onset of GDPR is the ability to configure privacy modes for content flowing across services. Content classification system 100 provides ways to change privacy modes, examples of which include CONFIDENTIAL, HIGHLY_CONFIDENTIAL, PUBLIC_CONTENT, PRIVATE_CONTENT, and DEFAULT. Depending on the level of privacy needed, each of classification services 152-158 produces different tracking events in separate clusters, logs information with different scraping strategies, or does not log at all. As the confidentiality of the privacy mode increases, more techniques are applied to the content, such as obfuscating private data, or not allowing tracking or even logging of certain data.

Thus, different types of clients may be associated with different types of confidentiality. For example, content classification system 100 allows a user representing a messaging client to set the confidentiality of content (i.e., messages) coming from the messaging client to highly confidential. Therefore, any content classification requests from the messaging client will be processed with the highly confidential privacy mode. In contrast, public content, such as public profile content, may be associated with a lower (or default) confidential privacy mode. Prior to embodiments, every software code that processes a content classification request would have to be modified in order to implement a confidentiality mode.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
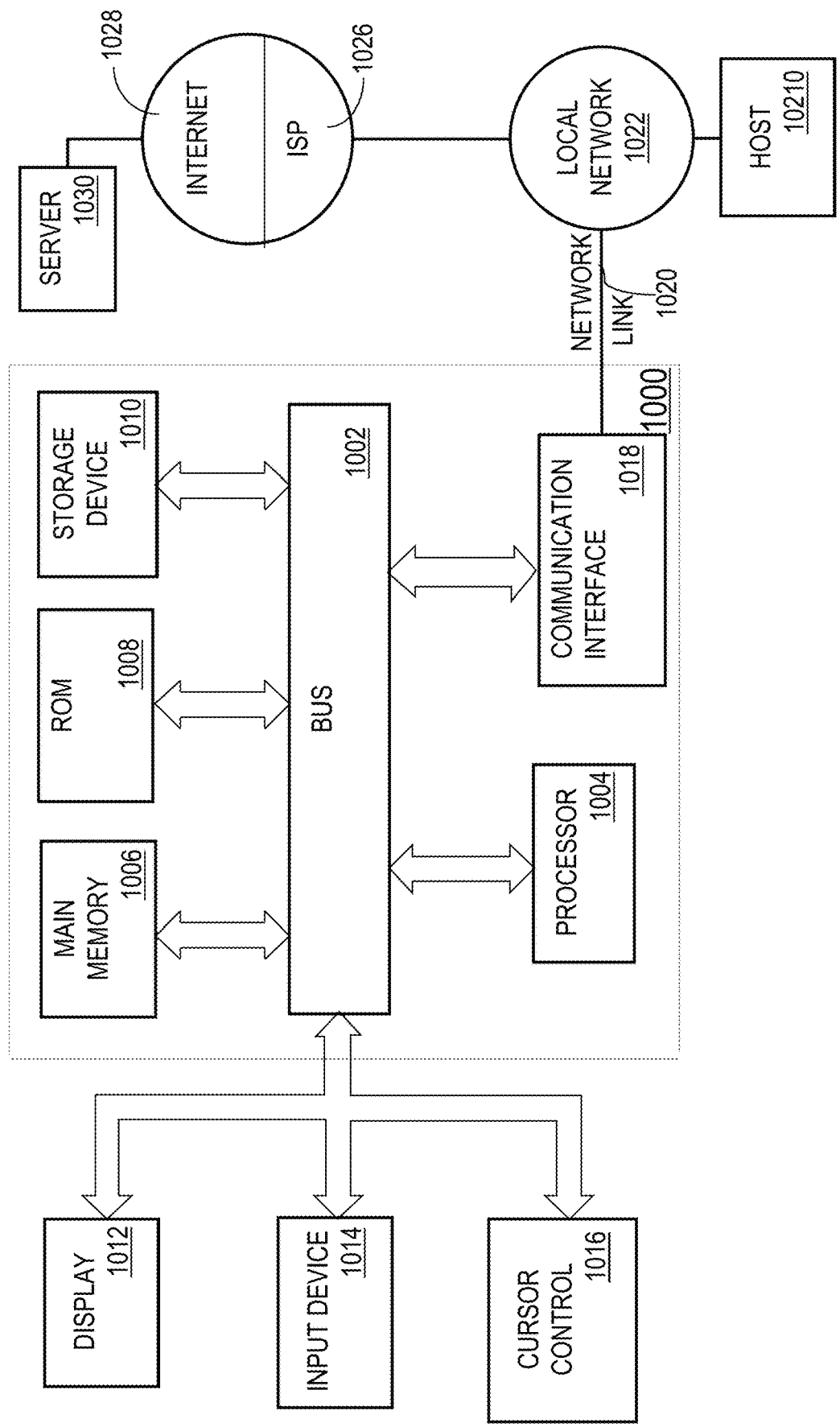
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    displaying, through a first user interface of a content classification platform, a plurality of selectable options, each corresponding to a different processor type;
    receiving, through the first user interface, user selection of a particular processor type;
    receiving, through a second user interface of the content classification platform, a processor configuration;
    based on the user selection and the processor configuration, storing processor data that associates the particular processor type and the processor configuration in association with a particular client context;
    receiving, from a client associated with the particular client context, a content classification request;
    in response to receiving the content classification request:
        identifying particular content that is referenced by the content classification request;
        accessing the processor data based on the content classification request;
        causing a processor that is defined based on the processor data to be executed based on the particular content;
        generating a result based on output from the processor;
    wherein the method is performed by one or more computing devices.

2. The method of claim 1, wherein receiving the processor configuration comprises receiving, through the second user interface, input that selects a graphical element that indicates a copy of the processor configuration that is used by a second client context that is different than the particular client context.

3. The method of claim 1, further comprising:
    storing second processor data that associates the particular processor type and the processor configuration in association with a second client context that is different than the particular client context;
    receiving, from a second client associated with the second client context, a second content classification request;
    in response to receiving the second content classification request:
        identifying second content that is referenced by the second content classification request;
        accessing the second processor data based on the second content classification request;
        causing the processor that is defined based on the second processor data to be executed based on the second content;
        generating a second result based on second output from the processor.

4. The method of claim 1, further comprising:
    prior to receiving the content classification request, receiving, through a third user interface of the content classification platform, data that specifies an applicability filter that comprises one or more selection criteria that specifies an attribute of a future content classification request and an attribute value of the attribute;
    in response to receiving the content classification request:
        making a determination, based on the content classification request, whether the one or more selection criteria are satisfied;
    wherein causing the processor to be executed is in response to the determination.

5. The method of claim 4, wherein:
    the one or more selection criteria is one or more first selection criteria of a first sub filter of the applicability filter;
    the applicability filter comprises a second sub filter that comprises one or more second selection criteria that specifies an attribute of a particular processor or of a future response to the particular processor;
    the method further comprising, in response to receiving the content classification request:
        making a second determination whether the one or more second selection criteria are satisfied;
    the output from the processor is based on the second determination.

6. The method of claim 1, wherein the processor comprises (a) a classifier that classifies the particular content or (b) aggregation logic that accepts, as input, output from the classifier that classifies the particular content and output from one or more other processors.

7. The method of claim 1, further comprising:
    displaying, in a third user interface of the content classification platform, a processor tree and one or more graphical control elements for modifying, through the third user interface, the processor tree that comprises a plurality of graphical elements that include (1) first graphical elements that correspond to a plurality of leaf processors and (2) second graphical elements that corresponding to one or more non-leaf processors;
    in response to receiving the content classification request:
        based on the processor tree and data within the content classification request, identifying the plurality of leaf processors;
        causing the plurality of leaf processors to run;

causing results from the plurality of leaf processors to be input to the one or more non-leaf processors;
wherein the result is based on particular output from the one or more non-leaf processors.

8. The method of claim 7, further comprising:
receiving, through the third user interface, a particular selection of a particular graphical control element of the one or more graphical control elements, wherein the particular graphical control element is associated with a particular processor indicated by the processor tree;
in response to receiving the particular selection, storing inactive processor data that indicates that the particular processor is inactive with respect to the particular client context;
in response to receiving the content classification request, determining, based on the inactive processor data, that the particular processor is not to be executed in response to the content classification request.

9. The method of claim 1, further comprising:
displaying, in a third user interface of the content classification platform, a plurality of graphical elements for creating a content extraction configuration for the particular client context;
receiving, through the third user interface, input that specifies a first path;
associating the first path with a particular content map key;
creating the content extraction configuration based on the first path and the particular content map key;
wherein identifying the particular content that is referenced by the content classification request is performed using the content extraction configuration.

10. The method of claim 9, wherein identifying the particular content is performed by a classification service of the content classification platform using the first path of the content extraction configuration identify the particular content.

11. The method of claim 1, further comprising:
displaying, in a third user interface of the content classification platform, one or more graphical elements for creating a new client context;
in response to receiving user selection of the one or more graphical elements, displaying, in a fourth user interface of the content classification platform, one or more text input fields for naming and describing the new client context;
in response to receiving a name and description through the fourth user interface, updating a data store with the name and description of the new client context.

12. The method of claim 1, wherein the content classification platform provides user interfaces for creating or updating two or more of the following types of information: feature extraction configurations, applicability filter configurations, integration documents and checklists, system lineage information, processor configurations, system level metrics, processor performance metrics, privacy configurations, or data sampling results and configurations.

13. The method of claim 12, wherein the content classification platform provides users interfaces for system level metrics, processor performance metrics, or data sampling results and configurations.

14. The method of claim 1, further comprising:
displaying, through a third user interface of the content classification platform, a plurality of confidentiality modes;
receiving, through the third user interface, input that selects a particular confidentiality mode of the plurality of confidentiality modes;
in response to receiving the input, storing confidentiality data that associates the particular confidentiality mode with content from the particular client context;
after storing the confidentiality data, receiving, from a second client associated with the particular client context, a second content classification request;
in response to receiving the second content classification request:
determining that the particular client context is associated with the second content classification request;
based on the confidentiality data, identifying the particular confidentiality mode;
applying, to certain content of the second content classification request, a confidentiality technique that is associated with the particular confidentiality mode.

15. The method of claim 1, further comprising:
storing compulsory data that indicates a first set of classifications that is compulsory and a second set of classifications that is non-compulsory;
storing permission data that indicates a first set of entities that is able to modify the first set of classifications;
making a determination, at the content classification platform, that a particular entity is not in the first set of entities;
based on the determination, preventing the particular entity from disabling any classification in the first set of classifications.

16. The method of claim 1, further comprising:
invoking, by an aggregator service of the content classification platform, using a domain specific language (DSL), a plurality of classification services hosted by the content classification platform.

17. The method of claim 1, further comprising:
storing, by the content classification platform, a plurality of applicability filter rules according to a first domain specific language (DSL); and
storing, by the content classification platform, a plurality of context extraction configurations according to a second DSL.

18. The method of claim 1, further comprising:
receiving, from a second client associated with a second client context, a second content classification request;
in response to receiving the second content classification request:
identifying a particular processor tree that comprises a plurality of processors;
identifying a set of filter rules associated with the second client context;
determining that criteria of a subset of the set of filter rules are satisfied;
applying the subset of the set of filter rules to the particular processor tree to identify a strict subset of the plurality of processors;
in response to identifying causing the strict subset of the plurality of processors to be executed in response to the second content classification request without causing any processor outside of the strict subset to be executed.

19. The method of claim 1, further comprising:
displaying, through a third user interface of the content classification platform, a plurality of privacy modes, each corresponding to a different set of privacy techniques;

receiving, through the third user interface, user selection of a particular privacy mode that is associated with a particular set of privacy techniques;
causing the particular privacy mode to be stored in association with the particular client context;
in response to receiving the content classification request:
identifying the particular privacy mode that is associated with the particular client context;
applying the particular set of privacy techniques with respect to the particular content.

20. One or more storage media storing instructions which, when executed by one or more processors, cause:
displaying, through a first user interface of a content classification platform, a plurality of selectable options, each corresponding to a different processor type;
receiving, through the first user interface, user selection of a particular processor type;
receiving, through a second user interface of the content classification platform, a processor configuration;
based on the user selection and the processor configuration, storing processor data that associates the particular processor type and the processor configuration in association with a particular client context;
receiving, from a client associated with the particular client context, a content classification request;
in response to receiving the content classification request:
identifying particular content that is referenced by the content classification request;
accessing the processor data based on the content classification request;
causing a processor that is defined based on the processor data to be executed based on the particular content;
generating a result based on output from the processor.

\* \* \* \* \*